US010915870B2

(12) United States Patent
Gillen

(10) Patent No.: US 10,915,870 B2
(45) Date of Patent: Feb. 9, 2021

(54) CONCEPTS FOR MAINTAINING UPDATED ELECTRONIC TASK-MANAGEMENT RECORDS REFLECTING PLANNED SHIPMENT ACTIVITIES

(71) Applicant: United Parcel Service of America, Inc., Atlanta, GA (US)

(72) Inventor: Robert J. Gillen, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 475 days.

(21) Appl. No.: 15/249,937

(22) Filed: Aug. 29, 2016

(65) Prior Publication Data
US 2018/0060829 A1 Mar. 1, 2018

(51) Int. Cl.
G06Q 10/06 (2012.01)
G06Q 10/10 (2012.01)
G06Q 10/08 (2012.01)
G06F 16/23 (2019.01)
G06Q 10/00 (2012.01)

(52) U.S. Cl.
CPC ..... *G06Q 10/1097* (2013.01); *G06F 16/2358* (2019.01); *G06Q 10/00* (2013.01); *G06Q 10/083* (2013.01)

(58) Field of Classification Search
USPC ..... 705/7.11, 7.13, 7.21–7.25, 330; 711/109; 718/103
See application file for complete search history.

(56) References Cited

U.S. PATENT DOCUMENTS

| 7,551,780 | B2 | 6/2009 | Nudd et al. |
| 8,010,463 | B2 | 8/2011 | Gillen |
| 8,362,894 | B2 | 1/2013 | Shah |
| 8,712,922 | B2 | 4/2014 | Kadaba |
| 8,712,923 | B2 | 4/2014 | Kadaba |

(Continued)

FOREIGN PATENT DOCUMENTS

WO 2005/065390 A2 7/2005

OTHER PUBLICATIONS

ISA/220—Notification of Transmittal or Search Report and Written Opinion of the ISA, or the Declaration dated Oct. 10, 2017 for WO Application No. PCT/US17/047951.

(Continued)

*Primary Examiner* — Akiba K Robinson
(74) *Attorney, Agent, or Firm* — Shook, Hardy & Bacon L.L.P.

(57) ABSTRACT

Computer-implemented methods, apparatus, and computer program products are provided. In one embodiment, shipment information/data corresponding to a proposed shipment from a customer computing device is received. The shipment information/data may be generated based on a task-management record from user input provided from a shipper. The shipment information/data also identifies a destination location and a desired delivery date for the proposed shipment. In one embodiment, updated shipment information/data is generated and causes the customer computing device to generate updated task-management records via a task-management software application based at least in part on one or more tender dates.

30 Claims, 10 Drawing Sheets

(56) References Cited

U.S. PATENT DOCUMENTS

| | | | |
|---|---|---|---|
| 9,015,192 B1* | 4/2015 | Nachum | G06F 17/30424 |
| | | | 707/769 |
| 2007/0088587 A1 | 4/2007 | Jakobsen et al. | |
| 2008/0162241 A1* | 7/2008 | Betancourt | G06Q 10/083 |
| | | | 705/337 |
| 2011/0126123 A1 | 5/2011 | Reter et al. | |
| 2012/0303541 A1* | 11/2012 | Marcus | G06Q 10/00 |
| | | | 705/330 |
| 2013/0094693 A1* | 4/2013 | Bolton | G06Q 10/0833 |
| | | | 382/101 |
| 2014/0108136 A1 | 4/2014 | Zhao et al. | |
| 2015/0348173 A1 | 12/2015 | Gillen | |
| 2015/0363843 A1 | 12/2015 | Loppatto et al. | |
| 2016/0042317 A1* | 2/2016 | Goodman | G06Q 10/0833 |
| | | | 705/333 |

OTHER PUBLICATIONS

Heller, Laura, "JCPenney adds visual search", FierceRetail, Apr. 1, 2015, 2 pages, retrieved from < http://www.fierceretail.com/operations/jcpenney-adds-visual-search > on Mar. 23, 2017.

Heller, Laura, "Macy's Betting On QR Code Revival and Image Recognition", FierceRetail, Jan. 21, 2014, 3 pages, retrieved from < http://www.fierceretail.com/operations/macy-s-betting-qr-code-revival-and-image-recognition > on Mar. 23, 2017.

Heller, Laura, "Mobile visual search unlocks m-commerce", FierceRetail, Nov. 5, 2015, 6 pages, retrieved from < http://www.fierceretail.com/operations/mobile-visual-search-unlocks-m-commerce > on Mar. 23, 2017.

Heller, Laura, "Neiman Marcus CMO Wanda Gierhart talks visual search", FiereceRetail, Aug. 31, 2015, 2 pages, retrieved from <http://www.fierceretail.com/operations/neiman-marcus-cmo-wanda-gierhart-talks-visual-search > on Mar. 23, 2017.

Heller, Laura, "Toys R Us adds visual search", FierceRetail, May 12, 2015, 2 pages, retrieved from < http://www.fierceretail.com/operations/toys-r-us-adds-visual-search > on Mar. 23, 2017.

Johnson, Lauren, "Macy's CMO: QR code revival driven by image recognition", Mobile Marketer, Jan. 17, 2014, 4 pages, retrieved from < http://www.mobilemarketer.com/cms/news/strategy/17003.html > on Mar. 23, 2017.

Kioui LLC, "Ki To Do (Applications), ebay, May 22, 2012, 6 pages, retrieved from <https://applications.ebay.com/selling?ViewEAppDetails&appType=1&appId=kitodo.kioui-apps.com&tab=Pricing"> on Mar. 23, 2017.

Kolodny, Lora, "Gametime now lets users "snap and sell" printed tickets", TechCrunch, Apr. 28, 2016, 5 pages, retrieved from <http://social.techcrunch.com/2016/04/28/gametime-now-lets-users-snap-and-sell-printed-tickets/ > on Mar. 23, 2017.

Luden, Ingrid, "To-Do App Wunderlist Debuts an API, Early Integrations of Slack, Sunrise, HipChat and More", TechCrunch, Mar. 13, 2015, 6 pages, retrieved from < http://social.techcrunch.com/2015/05/13/to-do-app-wunderlist-debuts-an-api-early-integrations-of-slack-sunrise-hipchat-and-more/ > on Mar. 23, 2017.

Perez, Sarah, "Plastiq lets you pay any bill with your credit or debit card just by snapping a photo", TechCrunch, Apr. 21, 2016, 9 pages, retrieved from < http://social.techcrunch.com/2016/04/21/plastiq-lets-you-pay-any-bill-with-your-credit-or-debit-card-just-by-snapping-a-photo/ > on Mar. 23, 2017.

Renfrow, Jacqueline, "Neiman Marcus expands Snap.Find.Shop visual search", FierceRetail, Aug. 27, 2015, 3 pages, retrieved from < http://www.fierceretail.com/operations/neiman-marcus-expands-snap-find-shop-visual-search > on Mar. 23, 2017.

Office Action for Canadian Patent Application No. 3,032,413, dated Dec. 9, 2019, 5 pages.

* cited by examiner

US 10,915,870 B2

CONCEPTS FOR MAINTAINING UPDATED ELECTRONIC TASK-MANAGEMENT RECORDS REFLECTING PLANNED SHIPMENT ACTIVITIES

BACKGROUND

Individuals, businesses, and other shippers of items/shipments often desire that their shipments arrive at an intended destination location by a particular date and/or time. For example, an individual may desire that an item/shipment reach an intended recipient by the recipient's birthday. Thus, individuals are often required to estimate when an item/shipment should be sent to ensure that it arrives by the desired delivery date. In certain instances, individuals may not have complete and accurate information/data regarding the estimated transportation time needed in order to send the shipment to the desired destination, and thus the individuals may be unable to accurately determine an appropriate date to provide the shipment to a carrier for transportation to the destination location.

Accordingly, a need exists for systems and methods for informing shippers of dates by which shipments should be tendered to a carrier to ensure that the shipment will arrive at an intended destination location by a desired delivery date.

BRIEF SUMMARY

Various embodiments are directed to concepts for facilitating the completion of a task list stored on a user's computing device by automatically initiating a shipping process for shipping related tasks, and for electronically generating additional, timely reminders for the user to ensure that any needed physical shipping tasks are completed. Various embodiments thus describe individual components of an electronic device to initiate the shipping process by automatically providing a carrier computing system with situation-specific shipping data utilized to generate electronic shipping records utilized during shipment based on a user's electronic to-do list, the user's current location, and/or other characteristics of the user's electronic device. In general, embodiments of the present invention provide methods, apparatus, systems, computing devices, computing entities, and/or the like for providing shippers with automatically generated reminders/notifications for a prospective shipment Various embodiments are directed to concepts for facilitating the completion of a task list stored on a user's computing device by automatically initiating a shipping process for shipping related tasks, and for electronically generating additional, timely reminders for the user to ensure that any needed physical shipping tasks are completed. Various embodiments thus describe individual components of an electronic device to initiate the shipping process by automatically providing a carrier computing system with situation-specific shipping data utilized to generate electronic shipping records utilized during shipment based on a user's electronic to-do list, the user's current location, and/or other characteristics of the user's electronic device. In general, embodiments of the present invention provide methods, apparatus, systems, computing devices, computing entities, and/or the like for providing shippers with automatically generated reminders/notifications for a prospective shipment. In accordance with one aspect, a computer-implemented method for remotely monitoring, via a communication interface, an electronic task-management database operable to store one or more electronic task-management records on a customer computing device to detect a newly added electronic task-management record; receiving, via the communication interface, the newly added electronic task-management record, wherein the newly added electronic task-management record identifies a task and comprises an image of a package generated by the customer computing device; determining, via one or more processors, whether the newly added electronic task-management record identifies a shipping task comprising at least one electronic component, wherein the at least one electronic component comprises generating an electronic shipment record for a shipment; upon determining that the newly added electronic task-management record identifies a shipping task comprising at least one electronic component, extracting shipment data, via the one or more processors, at least in part from the newly added electronic task-management record, wherein the shipment data identifies (i) a proposed shipment, (ii) the shipper, (iii) a destination location, (iv) a desired delivery date for the proposed shipment, and (v) the current location of the customer computing device; determining, via the one or more processors and based at least in part on the current location of the customer computing device, an origin location for the proposed shipment; generating, via the one or more processors and based at least in part on the shipment data, the electronic shipment record for the proposed shipment, wherein the electronic shipment record comprises shipment data identifying the shipper and the destination location; updating, via the one or more processors, the shipment data to comprise data identifying one or more tender dates and one or more service levels corresponding to each of the one or more tender dates for delivering the proposed shipment to the destination location by the desired delivery date; and remotely causing the customer computing device to generate one or more updated electronic task-management records each corresponding to one of the one or more tender dates.

In accordance with another aspect, an apparatus comprising at least one processor and at least one memory including computer program code is provided. In one embodiment, the at least one memory and the computer program code may be configured to, with the processor, cause the apparatus to at least: remotely monitor, via a communication interface, an electronic task-management database operable to store one or more electronic task-management records on a customer computing device to detect a newly added electronic task-management record; receive, via the communication interface, the newly added electronic task-management record, wherein the newly added electronic task-management record identifies a task; determine whether the newly added electronic task-management record identifies a shipping task comprising at least one electronic component, wherein the at least one electronic component comprises generating an electronic shipment record for a shipment; upon determining that the newly added electronic task-management record identifies a shipping task comprising at least one electronic component, extract shipment data extracting shipment data at least in part from the newly added electronic task-management record, wherein the shipment data identifies (i) a proposed shipment, (ii) the shipper, (iii) a destination location, (iv) a desired delivery date for the proposed shipment, and (v) the current location of the customer computing device; determine, based at least in part on the current location of the customer computing device, an origin location for the proposed shipment; generate, based at least in part on the shipment data, an electronic shipment record initiating shipment for the proposed shipment, wherein the electronic shipment record comprises data identifying the shipper and the destination location; update the shipment data to comprise data identifying one or more tender dates and one or more service levels corresponding to each of the one or more tender dates for delivering the proposed shipment to the destination location by the desired delivery date; and remotely cause the customer computing device to generate one or more updated electronic task-management records each corresponding to one of the one or more tender dates.

In accordance with yet another aspect, a computer program product is provided. The computer program product may comprise at least one non-transitory computer-readable storage medium having computer-readable program code portions stored therein, the computer-readable program code portions comprising executable portions collectively configured to at least: remotely monitor, via a communication interface, an electronic task-management database operable to store one or more electronic task-management records on a customer computing device to detect a newly added electronic task-management record; receive, via the communication interface, the newly added electronic task-management record, wherein the newly added electronic task-management record identifies a task; determine whether the newly added electronic task-management record identifies a shipping task comprising at least one electronic component, wherein the at least one electronic component comprises generating an electronic shipment record for a shipment; upon determining that the newly added electronic task-management record identifies a shipping task comprising at least one electronic component, extract shipment data extracting shipment data at least in part from the newly added electronic task-management record, wherein the shipment data identifies (i) a proposed shipment, (ii) the shipper, (iii) a destination location, (iv) a desired delivery date for the proposed shipment, and (v) the current location of the customer computing device; determine, based at least in part on the current location of the customer computing device, an origin location for the proposed shipment; generate, based at least in part on the shipment data, an electronic shipment record initiating shipment for the proposed shipment, wherein the electronic shipment record comprises data identifying the shipper and the destination location; update the shipment data to comprise data identifying one or more tender dates and one or more service levels corresponding to each of the one or more tender dates for delivering the proposed shipment to the destination location by the desired delivery date; and remotely cause the customer computing device to generate one or more updated electronic task-management records each corresponding to one of the one or more tender dates.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
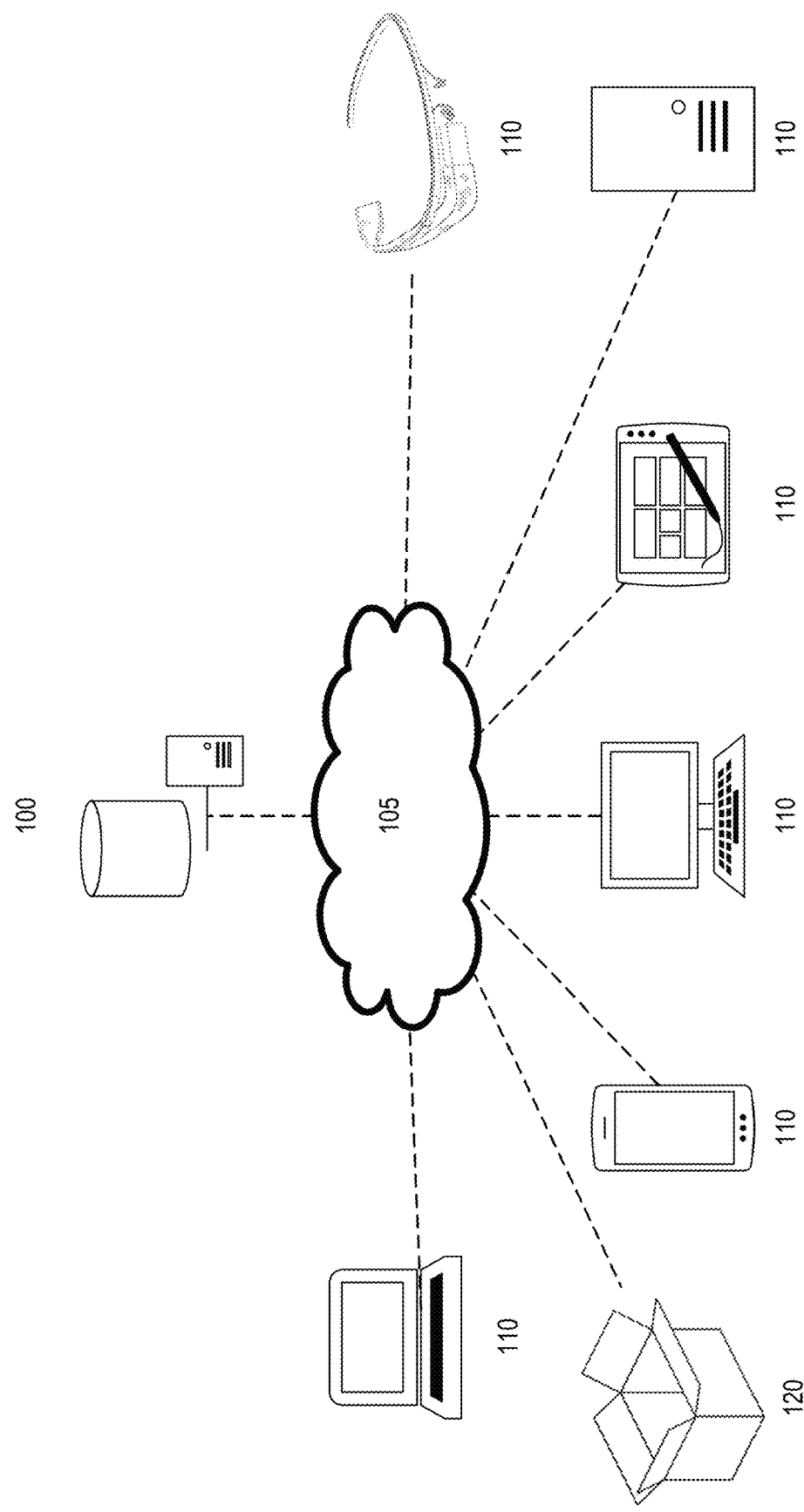
FIG. 1 is an exemplary schematic diagram of a system that may be used to practice various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. And terms are used both in the singular and plural forms interchangeably. Like numbers refer to like elements throughout.

Brief Overview

Various embodiments provide systems and methods for providing shippers of shipments/items with information/data identifying dates on which the shipper should tender the item/shipment to a carrier to ensure that the item/shipment arrives at a particular destination location by a desired delivery date. Thus, various embodiments enable shippers to provide a desired destination location and a desired delivery date for the item/shipment, and the various systems and methods may provide information/data indicative of a date on which the shipper should tender the item/shipment to the carrier for delivery. In certain embodiments, various computing entities utilized for providing the shipper with tender dates for the shipment may be configured to receive shipment information/data (e.g., identifying the destination location and/or desired delivery date) from one or more task-management software applications (e.g., to-do list software applications, calendar software applications, contact-management software applications, and/or the like) by extracting data from the task-management software application. For example, data indicative of the identity of a shipper (e.g., the user of the computing device), a destination location, a desired delivery date, and/or the like may be extracted from a task-management record (e.g., by parsing/extracting text data provided by a user). Moreover, upon identifying the one or more tender dates for the item/shipment 120, various embodiments may initiate the shipment process for the item/shipment 120. For example, instead of requiring the shipper to separately contact the carrier (e.g., through the carrier web site or through a brick-and-mortar storefront), the system may initialize the shipment, for example, by populating an electronic shipment record with data corresponding to the shipment and extracted from the task-management record. As such, various embodiments may allow users to automatically initialize the shipment process with substantially less time and effort than current technologies.

Moreover, the carrier system may leverage input sources such as task management systems to proactively suggest one or more alternative shipping options and/or drop-off locations to facilitate more efficient pick-up and/or delivery. In this regard, the system not only provides timely reminders for the shipper for when to ship a package, but also begins to complete a task underlying a task management record (e.g., a to-do list item). Such a configuration ensures the customer/shipper has accurate information regarding the shipment process. Furthermore, by removing the requirement that the customer/shipper separately contact the carrier (e.g., through the carrier website or through a brick-and-mortar storefront), the carrier system can substantially reduce data entry inaccuracies resulting from mishandling/misplacing shipment related data.

The following concepts generally relate to methods, systems, and computer products for automatically determining a shipping/tender date in order to ensure that an item/shipment 120 arrives on or by a desired delivery date, and/or for automatically generating a reminder and/or a task-management item to ship the item on the customer/shipper's customer computing entity. As will be recognized, this customer computing entity may be associated with the customer/shipper via a corresponding shipper/customer profile. In one embodiment, the carrier system (and/or other appropriately configured computing entity/entities) may obtain shipping information/data for a proposed shipment in order to predict/determine/identify a shipping/tender date to ensure the shipment arrives by the desired arrival date. As will be recognized, the proposed shipment may correspond to any shipping related task (e.g. a proposed "return" shipment). Thus, in various embodiments, the shipping information/data may comprise (1) the desired arrival date; (2) the destination location; and (3) the origin location, which may be determined automatically based on the current location of the customer's customer computing entity. This information/data may be provided by a customer via a generated user interface, or it may be retrieved from another input source such as, for example, another software application executing on the customer/shipper's customer computing entity, or by any other suitable method. For example, the system may retrieve shipping information/data from a task-management software application and/or a calendar software application executing on the shipper's customer computing entity.

In one embodiment, based on the received shipping data, which may include the desired arrival date, the origin location, and the destination location, or which may contain suitable information/data to determine such information, the carrier system may provide the user with information/data identifying one or more proposed shipping/tender dates to ensure the item/shipment arrives by the desired arrival date. The proposed shipping/tender dates may be generated on a software application installed on the customer computing entity and may trigger an alert for a user (a) to accept the proposed shipping information/data and initiate a shipment request or (b) to reject and/or review the proposed shipping information, thereby introducing a final review/confirmation process. In one embodiment, each planned shipment date may be associated with a different service level (e.g., ship item/shipment by Day 1 using Next-Day Air; ship by Day 2 using 2-Day Air; ship by Day 3 using ground shipping; and/or the like).

In various embodiments, the system may generate one or more reminders, automatically-triggered alerts, and/or task management items/shipments integrated with task-management software to be provided to the customer to ship the package. As will be discussed in detail below, the timing for the reminder may be identified based on a particular shipping methodology selected by the customer. Alternatively, the system may provide a reminder corresponding to each shipping service level. In addition, the carrier system may provide a reminder when the customer/shipper is near a predetermined drop-off location. In such embodiments, the system may be configured to disable/delete/complete related reminders upon receiving information/data indicating that the customer/shipper has completed the shipping task. Moreover, the reminders may be stored locally on the customer/shipper's customer computing entity (e.g., smartphone). In such embodiments, the system may instruct a native reminder application/task-management application (e.g., to-do list)/calendar application and/or the like to generate and store reminders/task items/shipments to ship the item/shipment 120. As will be explained in detail, various embodiments of the present invention facilitate the process of fully integrating carrier system 100 (and/or other appropriately configured computing entity/entities) with one or more task-management programs.

I. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, information/data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other information/data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

FIG. 1 provides an illustration of an exemplary embodiment of the present invention. As shown in FIG. 1, various embodiments may include one or more carrier systems 100, one or more networks 105, and one or more customer computing entities 110. Each of these components, entities, devices, systems, and similar words used herein interchangeably may be in direct or indirect communication with, for example, one another over the same or different wired or wireless networks and/or via any suitable communication interface. Additionally, while FIG. 1 illustrates the various system entities as separate, standalone entities, the various embodiments are not limited to this particular architecture.

Exemplary Carrier System

Figure 2:
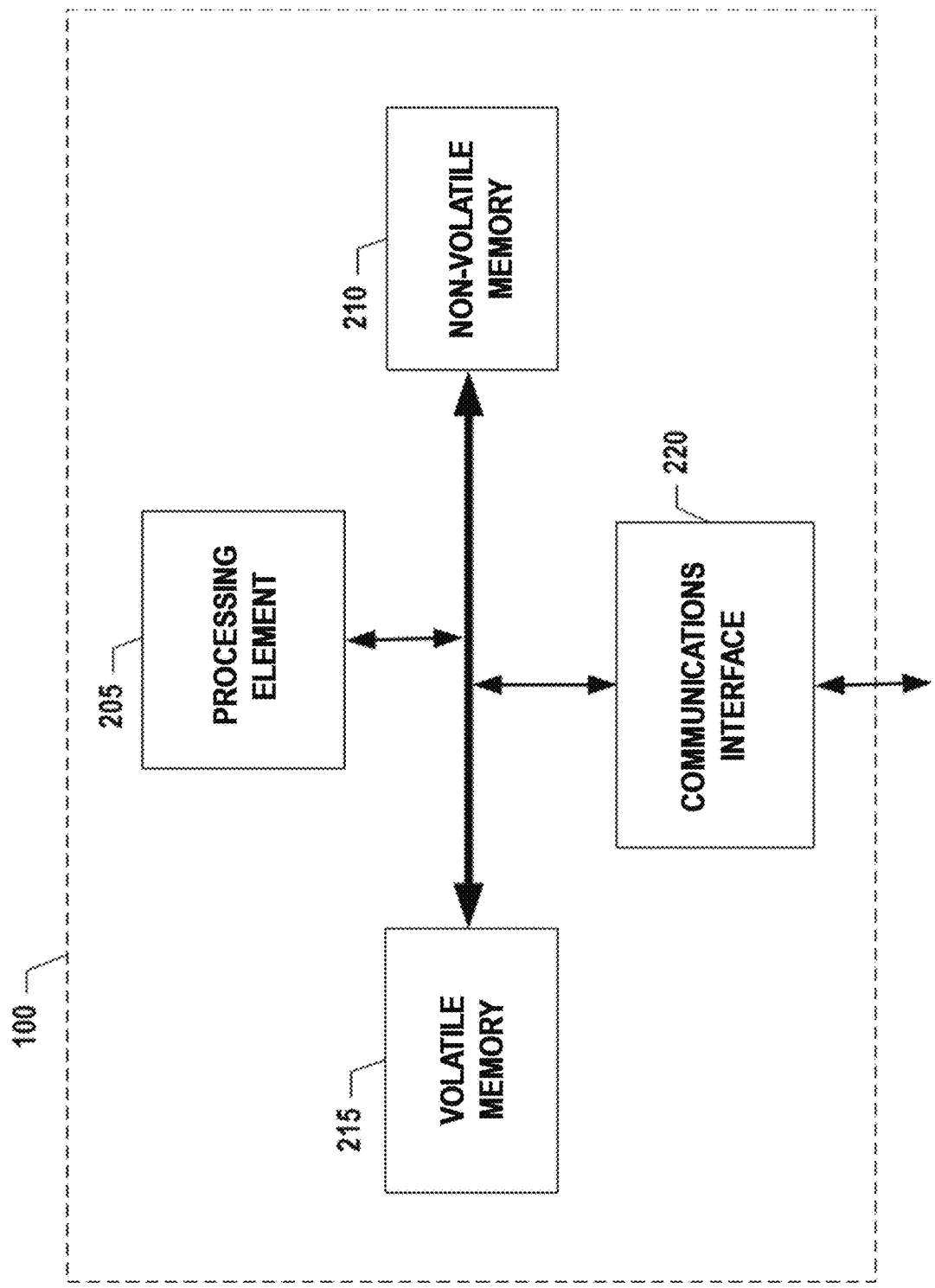
FIG. 2 is an exemplary schematic diagram of a carrier system in accordance with certain embodiments of the present invention.

FIG. 2 provides a schematic of a carrier system 100 according to one embodiment of the present invention. In general, the terms server, computing entity, computer, entity, device, system, and/or similar words used herein interchangeably may refer to, for example, one or more computers, computing entities, desktop computers, mobile phones, tablets, phablets, notebooks, laptops, distributed systems, dongles, items/devices, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the carrier system 100 may also include one or more communications interfaces 220 for communicating with various computing entities, such as by communicating data, content, information, and/or similar terms used herein interchangeably that can be transmitted, received, operated on, processed, displayed, stored, and/or the like.

The carrier system 100 can be operated by various entities, including carriers. A carrier may be a traditional carrier, such as United Parcel Service (UPS), FedEx, DHL, courier services, the United States Postal Service (USPS), Canadian Post, freight companies (e.g. truck-load, less-than-truckload, rail carriers, air carriers, ocean carriers, and/or the like), and/or the like. However, a carrier may also be a nontraditional carrier, such as Amazon, Google, Uber, ride-sharing services, crowd-sourcing services, retailers, and/or the like. As shown in FIG. 2, in one embodiment, the carrier system 100 may include or be in communication with one or more processing elements 205 (also referred to as processors, processing circuitry, processing device, and/or similar terms used herein interchangeably) that communicate with other elements within the carrier system 100 via a bus, for example. As will be understood, the processing element 205 may be embodied in a number of different ways. For example, the processing element 205 may be embodied as one or more complex programmable logic devices (CPLDs), "cloud" processors, microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the carrier system 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, electronic task-management database, and/or similar terms used herein interchangeably may refer to a collection of records or information/data that is stored in a computer-readable storage medium using one or more database models, such as a hierarchical database model, network model, relational model, entity—relationship model, object model, document model, semantic model, graph model, and/or the like.

In one embodiment, the carrier system 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the carrier system 100 with the assistance of the processing element 205 and operating system.

As indicated, in one embodiment, the carrier system 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the carrier system 100 may be configured to communicate via wireless external communication networks (and/or via any suitable communication interface) using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced information/data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the carrier system 100 may include or be in communication with one or more input elements, such as a keyboard input, a mouse input, a touch screen/display input, motion input, movement input, audio input, pointing device input, joystick input, keypad input, and/or the like. The carrier system 100 may also include or be in communication with one or more output elements (not shown), such as audio output, video output, screen/display output, motion output, movement output, and/or the like.

As will be appreciated, one or more of the carrier system's 100 components may be located remotely from other carrier system 100 components, such as in a distributed system. Furthermore, one or more of the components may be combined and additional components performing functions described herein may be included in the carrier system 100. Thus, the carrier system 100 can be adapted to accommodate a variety of needs and circumstances. As will be recognized, these architectures and descriptions are provided for exemplary purposes only and are not limiting to the various embodiments.

Exemplary Customer Computing Entity

Figure 3:
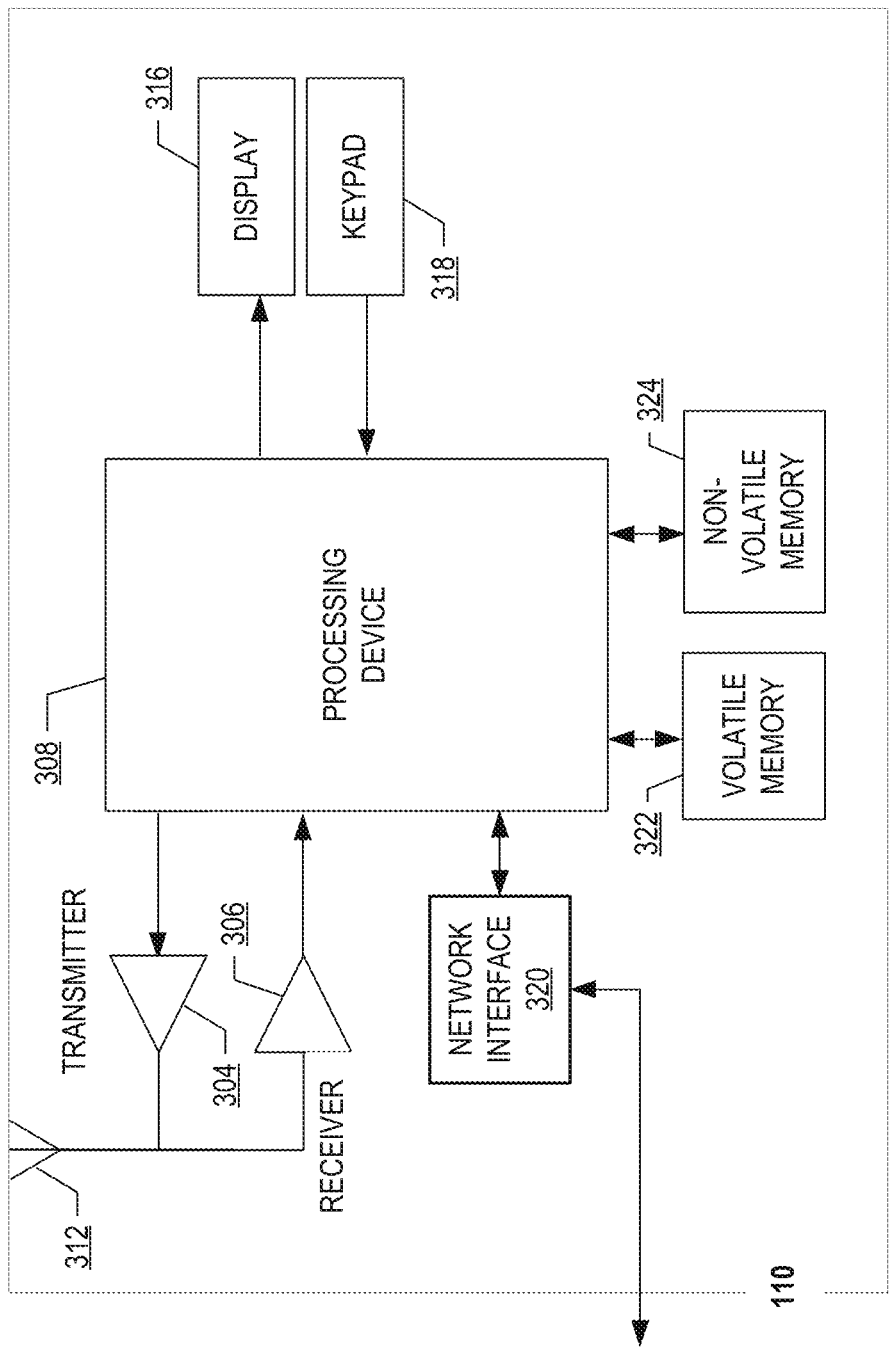
FIG. 3 is an exemplary schematic diagram of a customer computing entity in accordance with certain embodiments of the present invention.

A customer may be an individual, a family, a family member, a company, an organization, an entity, a department within an organization, a representative of an organization and/or person, and/or the like. Depending on the context, customers may be consignors/shippers and/or consignees/recipients. Accordingly, the term customer may refer to both consignors/shippers and/or consignees/recipients interchangeably. FIG. 3 provides an illustrative schematic representative of a customer computing entity 110 (also referred to as a mobile device) that can be used in conjunction with embodiments of the present invention. In one embodiment, the customer computing entities 110 may include one or more components that are functionally similar to those of the carrier system 100 and/or as described below. As shown in FIG. 3, a customer computing entity 110 (also referred to herein interchangeably as the mobile device) can include an antenna 312, a transmitter 304 (e.g., radio), a receiver 306 (e.g., radio), and a processing element 308 that provides signals to and receives signals from the transmitter 304 and receiver 306, respectively.

The signals provided to and received from the transmitter 304 and the receiver 306, respectively, may include signaling information/data in accordance with an air interface standard of applicable wireless systems to communicate with various entities, such as vehicles, carrier system 100, and/or the like. In this regard, the customer computing entity 110 may be capable of operating with one or more air interface standards, communication protocols, modulation types, and access types. More particularly, the customer computing entity 110 may operate in accordance with any of a number of wireless communication standards and protocols. In a particular embodiment, the customer computing entity 110 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the customer computing entity 110 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The customer computing entity 110 can also download changes, add-ons, and updates, for instance, to its firmware, software (e.g., including executable instructions, applications, program modules), and operating system. For example, in one embodiment, the customer computing entity 110 may store and execute a carrier application to assist in communicating with the carrier and/or for providing location services regarding the same.

According to one embodiment, the customer computing entity 110 may include location determining aspects, devices, modules, functionalities, and/or similar words used herein interchangeably. For example, the customer computing entity 110 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the customer computing entity's 105 position in connection with a variety of other systems, including cellular towers, Wi-Fi access points, and/or the like. Similarly, the customer computing entity 110 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, NFC transmitters, and/or the like. These indoor positioning aspects can be used in a variety of settings to determine the location of someone or something to within inches or centimeters.

The customer computing entity 110 may also comprise a user interface (that can include a display 316 coupled to a processing element 308) and/or a user input interface (coupled to a processing element 308). For example, the user interface may be an application, browser, user interface, dashboard, webpage, and/or similar words used herein interchangeably executing on and/or accessible via the customer computing entity 110 to interact with and/or cause display of information. The user input interface can comprise any of a number of devices allowing the customer computing entity 110 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the customer computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the customer computing entity can collect contextual information/data as part of the telematics data.

The customer computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the customer computing entity 110.

In another embodiment, the customer computing entity 110 may include one or more components or functionality that are the same or similar to those of the carrier system 100, as described in greater detail above. As will be recognized, these architectures and descriptions are provided for exemplary purposes only and are not limiting to the various embodiments.

Exemplary Item/Shipment 120

In one embodiment, an item/shipment 120 may be any tangible and/or physical object. In one embodiment, an item/shipment 120 may be or be enclosed in one or more packages, envelopes, parcels, bags, goods, products, containers, loads, crates, items/shipments 120 banded together, vehicle parts, pallets, drums, the like, and/or similar words used herein interchangeably. In one embodiment, each item/shipment 120 may include and/or be associated with item/shipment 120 identifier, such as an alphanumeric identifier. Such item/shipment 120 identifiers may be represented as text, barcodes, tags, character strings, Aztec Codes, Maxi-Codes, information/data Matrices, Quick Response (QR) Codes, electronic representations, and/or the like. A unique item/shipment 120 identifier (e.g., 123456789) may be used by the carrier to identify and track the item/shipment 120 as it moves through the carrier's transportation network. Further, such item/shipment 120 identifiers can be affixed to shipments/items 120 by, for example, using a sticker (e.g., label) with the unique item/shipment 120 identifier printed thereon (in human and/or machine readable form) or an RFID tag with the unique item/shipment 120 identifier stored therein. Such items/shipments 120 may be referred to as "connected" shipments/items 120 (e.g., "Internet of Things" enabled shipments/items 120, "IOT" enabled shipments/items 120, and/or the like) or "non-connected" shipments/items 120.

In one embodiment, connected shipments/items 120 include the ability to determine their locations and/or communicate with various computing entities. This may include the item/shipment 120 being able to communicate via a chip or other devices, such as an integrated circuit chip, RFID technology, Near Field Communication (NFC) technology, Bluetooth technology, Wi-Fi technology, and any other suitable communication techniques, standards, or protocols with one another and/or communicate with various computing entities for a variety of purposes. Connected shipments/items 120 may include one or more components that are functionally similar to those of the carrier system 100 and/or the customer computing entity 110 as described herein. For example, in one embodiment, each connected item/shipment 120 may include one or more processing elements, one or more display device/input devices (e.g., including user interfaces), volatile and non-volatile storage or memory, and/or one or more communications interfaces. In this regard, in some example embodiments, an item/shipment 120 may communicate send "to" address information/data, received "from" address information/data, unique identifier codes, location information/data, status information/data, and/or various other information/data.

In one embodiment, non-connected shipments/items 120 do not typically include the ability to determine their locations and/or might not be able communicate with various computing entities or are not designated to do so by the carrier. The location of non-connected shipments/items 120 can be determined with the aid of other appropriate computing entities. For example, non-connected shipments/items 120 can be scanned (e.g., affixed barcodes, RFID tags, and/or the like) or have containers or vehicles in which they are located scanned or located. As will be recognized, an actual scan or location determination of an item/shipment 120 is not necessarily required to determine the location of an item/shipment 120. That is, a scanning operation might not actually be performed on a label affixed directly to an item/shipment 120 or location determination might not be made specifically for or by an item/shipment 120. For example, a label on a larger container housing many shipments/items 120 can be scanned, and by association, the location of the shipments/items 120 housed within the container are considered to be located in the container at the scanned location. Similarly, the location of a vehicle transporting many shipments/items 120 can be determined, and by association, the location of the shipments/items 120 being transported by a vehicle are considered to be located in the vehicle at the determined location. These can be referred to as "logical" scans/determinations or "virtual" scans/determinations. Thus, the location of the shipments/items 120 is based on the assumption they are within the container or vehicle, despite the fact that one or more of such shipments/items 120 might not actually be there.

In various embodiments, shipments/items 120 may have associated Package Level Detail ("PLD") information/data associated therewith. The PLD information/data may be stored in a PLD database comprising one or more PLD profiles corresponding to each of a plurality of shipments/items 120. For example, the PLD information/data for a particular item/shipment 120 may comprise information/data indicative of an item/shipment 120 identifier associated with the item/shipment 120, an intended destination for the item/shipment 120, the current location of the item/shipment 120, a vehicle and/or storage location containing the item/shipment 120, and/or the like. In various embodiments, the PLD information/data for a particular item/shipment 120 may be updated to reflect current information/data for a particular item/shipment 120, for example, as the item/shipment 120 is transported by the carrier between an origin and a destination. For example, the current location of an item/shipment 120 may be updated to reflect the current location of the item/shipment 120. The current location of the item/shipment 120 may be reflective of a precise location determined by, for example, GPS or other location determining devices, or a location relative to other carrier locations (e.g., within a particular carrier hub, within a particular carrier vehicle, and/or the like). Moreover, the PLD information/data may be indicative of a current status of the item/shipment 120 relative to its intended delivery location. For example, the PLD information/data may indicate that an item/shipment 120 is "in transit" while the item/shipment 120 is in the possession of the carrier and prior to delivery, and "delivered" after the item/shipment 120 has been dropped off at its intended destination.

Moreover, in various embodiments, the PLD information/data may comprise contact information/data for an entity associated with the item/shipment 120 (e.g., the item/shipment 120 recipient). For example, the contact information/data may comprise an email address, telephone number, social media username (e.g., twitter username, Instagram username, and/or the like), and/or the like. In various embodiments, the contact information/data may be stored in association with PLD information/data for an item/shipment 120 based on user input providing information/data specific to a particular item/shipment 120 (e.g., when the item/shipment 120 is provided to the carrier). In certain embodiments, the contact information/data may be obtained automatically from a customer profile database comprising information/data for a plurality of item/shipment 120 recipients, shippers, and/or the like. As a non-limiting example, the contact information/data for a particular item/shipment 120 may be identified by comparing the PLD information/data for a particular item/shipment 120 against customer profile information/data stored in the customer profile database. Upon identifying a match between the PLD information/data and information/data corresponding to a particular customer profile (e.g., based on a match between the destination location for the item/shipment 120 and an address associated with a customer profile), contact information/data stored in association with the customer profile may be associated with the PLD information/data for the item/shipment 120.

Exemplary Task-Management Program

In certain embodiments, a task-management program 610 may be any program, group of programs, embedded software package, hardware, and/or cloud-based system that is designed for the end user for the purposes of initializing/recording/facilitating task-management. For example, the task-management program 610 may correspond to and/or comprises: a to-do list application (e.g., Wunderlist, Todoist, Remember the Milk, etc.), a voice assistant application (e.g., Siri, Cortana, Google Now, etc.), a note-taking application (e.g., Evernote, OneNote, Apple Notes, etc.), an instant messaging application (e.g., iMessage, WhatsApp, Hangouts, Allo, Slack, etc.), a camera application, a database program, a word processor, a web browser, a spreadsheet application, a calendar application, a reminder application, an email client application, and/or the like.

In various embodiments, the task-management program 610 may store input from the end user in the form of task-management information/data records. For example, task-management program 610 may comprise an internal database configured to store task-management information/data records. Moreover, the task-management program 610 may comprise software to enable bi-directional access to such task-management information/data records. For example, the task-management program 610 may comprise an application programming interface (API) that enables external software applications to download the contents of the task-management information/data records by sending a structured query to a web-enabled controller of the API. In certain embodiments, the task-management program 610 may be in communication with one or more external software applications, and accordingly the task-management program 610 may be configured (e.g. via an API) to directly integrate/associate/communicate with the carrier system 100, for example to initialize and transmit newly added electronic task-management records to the carrier system 100.

Exemplary Customer Profile

At a high level, integration with a task-management program on a customer computing entity 110 may involve accessing information/data associated with the user of the customer computing entity 110 (e.g., a shipper of an item/shipment 120) and storing shipping information/data containing descriptions and/or part numbers in some manner. In various embodiments, this process may be accomplished with enrollment/registration of one or more customers for a customer delivery program. Co-pending U.S. patent application Ser. No. 13/174,299, filed Jun. 30, 2011 and entitled "Customer Controlled Management of Shipments," which is incorporated by reference herein in its entirety, describes a registration process and operations of various customer delivery programs that may operate in conjunction with embodiments of the present invention. A customer may be an individual, a family, a company, an organization, an entity, a department within an organization, a representative of an organization and/or person, and/or the like. To register, a customer (e.g., a customer or customer representative operating a customer computing entity 110) may access a webpage or portal of a carrier, such as UPS. For instance, the carrier system 100 (and/or other appropriately configured computing entity/entities) may transmit a webpage that provides the customer with an option of logging into a customer account or enrolling/registering for a social customer delivery program via public social networks, business social networks and/or a private social network provided by the carrier. Moreover, in various embodiments, a customer may register by activating a stand-alone software application stored on the customer computing entity 110 that provides one or more user interfaces for receiving information/data from the customer for registering with the carrier. In various embodiments, the stand-alone software application may be configured to cause the customer computing entity 110 to transmit and/or receive information/data to/from the carrier system 100 during the registration process.

In one embodiment, as part of the enrollment/registration process, the customer (e.g., a customer or customer representative operating a customer computing entity 110) may be requested to provide biographic and/or geographic information/data to the carrier system 100 (and/or other appropriately configured computing entity/entities). For instance, the customer may provide the customer's name, such as a first name, a last name, a company name, an entity name, and/or an organization name. The customer may also provide any aliases associated with the customer. For instance, if the customer were an individual named Joseph Brown, the customer may provide Joe Brown or Joey Brown as aliases. Moreover, in various embodiments, the aliases may comprise one or more usernames associated with the user. For example, the aliases may comprise one or more social media usernames associated with the user, one or more desired user names to be associated with the user, and/or the like. The customer may also provide one or more addresses associated with the customer (e.g., street address, city, state, postal code, and/or country). For instance, Joseph Brown's address may be 105 Main Street, Atlanta, Ga. 30309, USA. As indicated, the customer may have multiple addresses associated with the account. For instance, Joseph Brown may have a home address and a business address associated with his account. Similarly, an organization may have multiple locations (e.g., addresses) associated with its account. When multiple addresses are provided, the customer may indicate which address should be used as the primary address. As will be recognized, the customer may provide other biographic and/or geographic information/data to adapt to various needs and circumstances.

In one embodiment, once the carrier system 100 (and/or other appropriately configured computing entity/entities) receives the necessary biographic and/or geographic information/data from the customer or customer's external social network, the carrier system 100 may perform one or more validation operations. The carrier system 100 (and/or other appropriately configured computing entity/entities) may determine whether the primary address (and/or other addresses) is valid, e.g., by passing the primary address through one or more address cleansing or standardization systems. The carrier system 100 may perform a variety of fraud prevention measures as well, such as determining whether the customer or one of the customer's addresses has been "blacklisted" from customer delivery programs. As will be recognized, a variety of other approaches and techniques can be used to adapt to various needs and circumstances.

In one embodiment, the carrier system 100 may create a customer profile for the customer via the enrollment/registration process. Accordingly, the carrier system 100 may create and store various customer profiles (e.g., via a database and/or carrier (private) internal social network). In addition to at least the information/data described above, a customer profile may include one or more corresponding usernames and passwords. Additionally, the carrier system 100 (and/or other appropriately configured computing entity/entities) may also create and store a customer identifier (e.g., personal ID) in association with the customer profile. In one embodiment, a customer identifier may be used to uniquely identify a customer profile. In another embodiment, a customer identifier may be used to uniquely identify a given address associated with a customer profile and/or carrier (private) internal social network. In such an embodiment, if a customer profile is associated with four addresses, the carrier system 100 (and/or other appropriately configured computing entity/entities) may create and store four customer identifiers in association with the customer profile. The customer identifier may also be stored in association with shipping information/data for an item/shipment 120 to associate the item/shipment 120 (and its shipping data) with the (a) correct customer (e.g., customer profile) and/or (b) correct address for a customer. In various embodiments, a customer identifier may be used in place of an address on an item/shipment 120 as will be discussed in greater detail below.

In one embodiment, a customer profile within a carrier social network may correspond to one or more customer delivery programs. For instance, a customer (e.g., a customer or customer representative operating a customer computing entity 110) may subscribe to one or more specific customer delivery programs. For example, the various customer delivery programs may allow customers to have access to certain features, e.g., delivery alerts, approximate delivery times, change delivery options, electronically authorize the release of an item, and/or route items/shipments 120 to will call. Other customer delivery programs may include allowing customers to route items/shipments 120 to other retail locations, reschedule deliveries, request that items/shipments 120 be delivered to another address, and/or provide instructions for delivery. As will be recognized, these features are provided for illustrative purposes and are not limiting to embodiments of the present invention. Moreover, a variety of other approaches and techniques can be used to adapt to various needs and circumstances.

In one embodiment, once a customer profile has been created, the customer (e.g., a customer or customer representative operating a customer computing entity 110) can provide various preferences associated with the customer delivery program to the carrier system 100 via a webpage, for example. For instance, the customer (e.g., a customer or customer representative operating a customer computing entity 110) can provide a variety of preferences, such communication preferences, delivery preferences, delivery options, and/or delivery instructions.

The carrier system 100 (and/or other appropriately configured computing entity/entities) may also provide a list of social network options from which the user may select. These options may include public Open Social Networks (e.g., Facebook, FourSquare, etc.), private carrier service Customer Social Networks (a private social network maintained by the carrier for users of the Delivery Service), a private Carrier Service Social Networks (a private social network maintained and constructed by the carrier via the carrier's internal operations' information/data to identify the members of a social network for consolidated deliveries), a user's Business Social Networks (e.g., Yammer, Socialcast, etc.) and/or a vehicle social network. Other social network options may be included as well. As will be discussed in greater detail below, information/data retrieved from these social networks may provide location information/data regarding the customer and thus be used to identify possible delivery locations.

Moreover, the carrier system 100 (and/or other appropriately configured computing entity/entities) may also provide the capability to setup a default configuration to be stored in the customer profile. For example, in the event that carrier system 100 is unable to collect certain parameters from the task-management program 610 and/or the information/data collected from task-management program 610 is ambiguous (e.g., the information/data collected from task-management program 610 may refer to a plurality of possible options), the carrier system 100 (and/or other appropriately configured computing entity/entities) may utilize the default configuration (which may be stored in the customer profile) to facilitate a shipment and/or to generate a task-management record as discussed herein. In one embodiment, this default configuration may be stored in a database 510 and thus accessible by the carrier system 100. For example, the default configuration may contain a default tender date if no such tender date is found from accessing the appropriate information/data from task-management program 610. This default tender date may correspond to the delivery preferences stored in the customer profile. For example, if the delivery preferences of the customer defaults to 2-Day Air, the carrier system 100 (and/or other appropriately configured computing entity/entities) may assign the tender date to be two days before the planned arrival date. Moreover, the default configuration may identify a default planned arrival date that may be identified based at least in part on a current date and/or time. For example, the default configuration may be configured to identify a default planned arrival date as a predefined number of days in the future from the current date and/or time. As a specific example, the default configuration may be configured to identify a default planned arrival date as 6-days from the present date.

In another embodiment, the default configuration may assign the tender date utilizing a configurable timespan (e.g., one week) from the date the carrier system 100 (and/or other appropriately configured computing entity/entities) obtained the information/data record from task-management program 610. In one embodiment, other types of information/data may be provided via the default configuration in the customer profile as well. For example, the from-address, a user-selectable toggle on whether to default to the from-address (vs defaulting to the shipper/customer 525's location), and/or the like.

Exemplary Location-Based Alerts/Notifications

In certain embodiments, the carrier system 100 (and/or other appropriately configured computing entity/entities) can automatically provide (e.g., generate, queue, and/or transmit) one or more location-based notifications/messages based on the configurable/determinable parameters for a given account. For example, the carrier system 100 (and/or other appropriately configured computing entity/entities) can automatically provide the location-based notifications/messages regarding items/shipments 120 that may need to be provided to a carrier. As will be recognized, this may include generating, queuing, and/or transmitting an email message to a customer's email address, a text message to a customer's cellular phone, a notification/message to a designated application, and/or the like based on the configurable/determinable parameters.

In one embodiment, to provide the location-based notifications/messages, the customer computing entity 110, carrier system 100, and/or a variety of other computing entities may perform location-based monitoring or determinations based on the configurable/determinable parameters for a given account. The location-based monitoring or determinations for entities and/or locations may be performed by an appropriate computing entity regularly, periodically, continuously, during certain time periods or time frames, on certain days, upon determining the occurrence of one or more configurable triggers/events, in response to requests, in response to determinations/identifications, combinations thereof, and/or the like. For example, an appropriate computing entity can monitor or determine/identify the locations of the various entities (e.g., item/shipment 120, carrier system 100, customer computing entities 110, and/or the like) and/or establishments/locations in response to certain triggers/events or requests. For example, the monitoring or determinations may only occur after task-management items/shipments 120 have been processed. In such an example, the processing of a task-management entry may trigger the setting a monitoring flag, initiate the monitoring, initiate a determination, and/or the like. Similarly, in one embodiment, the processing of a task-management entry may trigger the automatic generation and queueing of one or more notifications/messages regarding the same. The notifications/messages can be automatically provided when the relevant configurable/determinable parameters are satisfied.

In one embodiment, the monitoring or determining/identifying can be initiated using a variety of different triggers. For examples, the triggers/events may include (a) a customer's customer computing entity 110 being turned on or off; (b) a customer's customer computing entity 110 beginning to move; (c) a customer computing entity 110 moving out of a geofenced area; (e) a customer computing entity 110 moving into a geofenced area; and/or a variety of other triggers/events. As will be recognized, a variety of other approaches and techniques can be used to adapt to various needs and circumstances.

In one embodiment, if a configurable trigger/event is not detected or a request is not received, an appropriate computing entity (e.g., carrier system 100, customer computing entity 110, and/or the like) can determine/identify whether a configurable time period has begun or ended. If the appropriate computing entity (e.g., carrier system 100, customer computing entity 110, and/or the like) determines/identifies that the configurable time period has not begun or ended, the appropriate computing entity can continue monitoring for configurable triggers/events or requests. However, if the appropriate computing entity (e.g., carrier system 100, customer computing entity 110, and/or the like) determines/identifies that the configurable time period has begun or ended, the appropriate computing entity can continuously monitor whether the relevant configurable/determinable parameters are satisfied. The monitoring may continue indefinitely, until the occurrence of one or more configurable triggers/events, until a configurable time period has elapsed, combinations thereof, and/or the like.

Generally, the locations of various entities (carrier system 100, customer computing entities 110, and/or the like) can be monitored or determined/identified by any of a variety of computing entities—including carrier system 100, customer computing entities 110, and/or the like. For example, the locations may be monitored or determined/identified with the aid of or in coordination with location-determining devices, location-determining aspects, location-determining features, location-determining functionality, location-determining sensors, and/or other location services. Such may include GPS; cellular assisted GPS; real time location systems or server technologies using received signal strength indicators from a Wi-Fi network and/or via any suitable communication interface); triangulating positions in connection with a variety of other systems, including cellular towers, Wi-Fi access points, and/or the like; and/or the like. Using these and other approaches and techniques, an appropriate computing entity (e.g., carrier system 100, customer computing entity 110, and/or the like) can determine, for example, whether and when entities are within a configurable/determinable distance/proximity from one another and/or a known location.

In one embodiment, the configurable/determinable distance/proximity may be a distance, range, zone of confidence, proximity, geofence, tolerance, and/or similar words used herein interchangeably. For example, in one embodiment, the configurable/determinable distance/proximity may be plus or minus (±) a specific distance or range using a coordinate system (e.g., DD, DMS, UTM, and/or CARRIER). As will be recognized, a configurable/determinable distance/proximity may be in a variety of formats, such as degrees, minutes, seconds, feet, meters, miles (e.g., 3, 15, 30, or 50 feet), kilometers, and/or the like. Continuing with the above example, an appropriate computing entity may use a configurable/determinable distance/proximity of ±0.000001, ±0.000001 in the DD coordinate system (or configurable/determinable distance/proximities of ±0.000100, ±0.000100 or ±0.000010, ±0.000010) to determine/identify when configurable/determinable parameters for a customer are satisfied.

In the event such entities are within a configurable/determinable distance/proximity from each other (e.g., associated with one another) or from a known/determined location in accordance with the configurable/determinable parameters, an appropriate computing entity (e.g., carrier system 100, customer computing entity 110, and/or the like) can make this determination/identification and indicate or provide an indication of the same. The indication may include device/entity information/data associated with the corresponding customer computing entity 110 and/or customer computing entity 110, such as the corresponding device identifiers and names. The indication may also include other information/data, such as the location at which the establishments/locations and/or entities became within the configurable/determinable distance/proximity of each other or a known/determined location, the time at which the entities became within the configurable/determinable distance/proximity of each other or a known/determined location, the type of event (e.g., dropping off an item, and/or the like), and/or the like. In some embodiments, the appropriate computing entity can determine/identify the type of event. The appropriate computing entity (e.g., carrier system 100, customer computing entity 110, and/or the like) can then store the information/data in one more records and/or in association with the account, subscription, program, and/or the like corresponding to the shipper/customer.

The appropriate computing entity can also provide location-based notifications/messages in accordance with the corresponding notification/message preferences. In one embodiment, an appropriate computing entity can provide location-based notifications/messages when the configurable/determinable parameters are satisfied. For instance, when an appropriate computing entity determines/identifies that the configurable/determinable parameters for an account are satisfied, the appropriate computing entity can automatically provide appropriate location-based queued notifications/messages and/or automatically generate, queue, and transmit appropriate location-based notifications/messages in compliance with the corresponding notification/message preferences. By way of example, assume John (carrying his customer computing entity 110) arrives near a known drop-off location, such as a UPS store, (34.3218697, −83.1239871) and enters a geofence or is within a configurable/determinable distance/proximity (e.g., ±0.000001, ±0.000001) of the known drop-off location (e.g., a UPS store). An appropriate computing entity can make such a determination/identification based on the monitoring. In response, an appropriate computing entity (e.g., carrier system 100, user computing entity 110, and/or the like) can automatically provide appropriate location-based queued notifications/messages and/or automatically generate, queue, and transmit appropriate location-based notifications/messages.

Exemplary Networks

In one embodiment, any two or more of the illustrative components of the architecture of FIG. 1 may be configured to communicate with one another via respective communicative couplings to one or more networks 105. The networks 105 may include, but are not limited to, any one or a combination of different types of suitable communications networks and/or suitable communication interfaces, such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 105 may have any suitable communication range associated therewith and may include, for example, global networks (e.g., the Internet), metropolitan area networks (MANs), wide area networks (WANs), local area networks (LANs), or personal area networks. In addition, the networks 105 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

III. EXEMPLARY SYSTEM OPERATION

Reference will now be made to FIGS. 4, 5A, 5B, 6A, 6B, 7A, 7B, 8A, 8B, and 9. FIGS. 4, 5A, 5B, and 9 are flow diagrams illustrating operations, steps, and processes that may be performed for classifying a commodity and/or incorporating a prediction feedback system.

Exemplary Carrier System Operation

Figure 4:
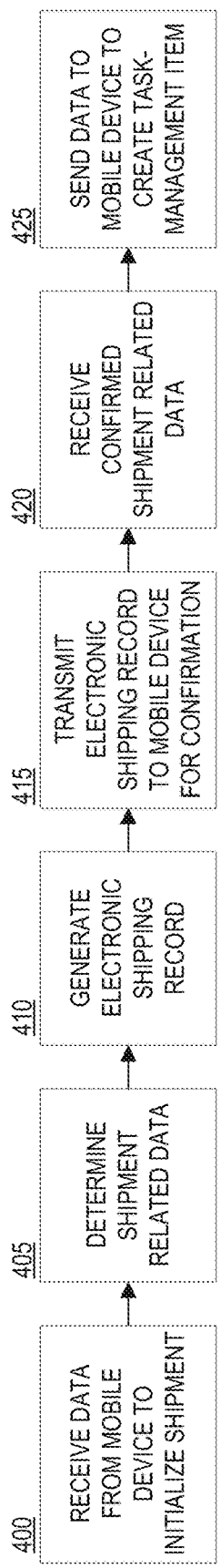
FIG. 4 is an exemplary flow diagram for generating task-management indicative of an appropriate drop-off date for a shipment according to certain embodiments of the present invention.

FIG. 4 is an exemplary high level flow diagram of a process for integrating shipping logistics with a task-management program 610. As discussed herein, various shipment tasks encompassing shipment from an origin to a destination may comprise one or more electronic components. For example, in addition to physically transferring a shipped item from an origin to a destination, shipment tasks may comprise generating item/shipment information/data transmitted to the carrier, tracking the location of the item/shipment 120 as it moves through a carrier's logistics network, and/or the like. Accordingly, initializing an item/shipment 120 in anticipation of shipping the shipment/item 120 may comprise generating electronic item/shipment information/data to be utilized by the carrier, for example, to track the location of the item/shipment 120 as it moves through the carrier's logistics network between the origin and the destination corresponding to the item/shipment. As discussed in greater detail herein, the customer computing entity 110 and/or the carrier system 100 may be configured to facilitate the completion of one or more electronic components of a shipment task upon determining that a particular task-management record is indicative of an anticipated shipment task. For example, the carrier system 100 may identify a particular shipment-related task management record as comprising one or more keywords (e.g., "ship," "send", and/or "determine") thus requiring an additional electronic component/module to complete the electronic shipping task (or shipment-related task) retrieved from the shipment information/data.

As discussed herein, a customer computing entity 110 (e.g., a smartphone) is associated with a customer/shipper 525, such that the carrier system 100 may receive shipment information/data for a prospective item/shipment 120 from the customer computing entity 110 to initialize a shipment and/or to identify one or more tender dates by which the item/shipment 120 should be provided to the carrier. For example, the mobile device and/or other customer computing device 110 may comprise a non-transitory memory storing information/data identifying the shipper/user associated with the mobile device. In various embodiments, the information/data identifying the shipper/user associated with the customer computing entity 110 may be stored within the memory of the mobile device such that the carrier system 100 may receive the information/data identifying the shipper/user, for example, in response to receipt of information/data indicating the shipper/user desires to ship an item/shipment 120. As discussed herein, upon receipt of shipment information/data from a customer computing entity 110, the carrier system 100 may be configured to identify a customer/shipper 525 associated with the customer computing entity 110.

In one embodiment, this information/data may be generated by a task-management application (e.g., to-do list, reminder, calendar software application, and/or the like) stored on the customer computing entity 110. The carrier system 100 may receive shipment information/data from the customer computing entity 110 via at least one of a plurality of possible communication mechanisms, as indicated in Block 400 of FIG. 4. For example, the task-management program 610 may directly communicate with the carrier system 100 (and/or other appropriately configured computing entity/entities), for example via a wireless communication network through an application programming interface (API). In this manner, the task-management program 610 may transmit information/data (e.g., item/shipment 120 information/data as discussed herein) to the carrier system 100 (and/or other appropriately configured computing entity/entities), for example, in response to the receipt of user input received by the customer computing entity 110 providing information/data indicative of a prospective item/shipment 120. Alternatively, the carrier system 100 may periodically query the task-management program 610 for all the information/data updates since the last query.

In other embodiments, the carrier system 100 (and/or other appropriately configured computing entity/entities) may interact with the task-management program 610 through a "bridging" module. This bridging module may be a client-side software application that is affiliated with the carrier system 100 (e.g., a mobile device software application published by a carrier) and/or has access to all appropriate information/data stored in the customer profile. In such a configuration, the customer/shipper 525 may register and/or log-in to the bridging module to access their respective default configurations stored in the customer profile. This may allow the carrier system 100 (and/or other appropriately configured computing entity/entities) to integrate with the task-management program 610 in a more secure fashion. Additionally, the bridging module may proactively download all relevant information/data from the customer profile to reduce the amount of network transactions (e.g., https requests) between the carrier system 100 and the task-management program 610.

In one embodiment, the carrier system 100 (and/or other appropriately configured computing entity/entities) may receive 400 shipment information/data for a prospective item/shipment 120 from the customer computing entity 110 comprising an image of an item/shipment 120. For example, the customer/shipper 525 may utilize a camera associated with a customer computing entity 110 (e.g., a still-frame camera and/or a video camera) to capture and/or scan an image of an item/shipment 120. In various embodiments, the image may comprise information/data specific to the item/shipment 120, such as information/data identifying a destination location, an origin location, a service level, and/or the like. The information/data specific to the item/shipment 120 may be printed or otherwise secured to the item/shipment 120, and/or it may be proximate to the item/shipment 120. The carrier system 100 (and/or other appropriately configured computing entity/entities) may subsequently utilize optical character recognition (OCR) techniques to convert the information/data corresponding to the item/shipment 120 into machine-encoded text. If the image does not identify information/data corresponding to the item/shipment 120, the carrier system 100 may allow the customer/shipper 525 to complete the shipping information/data using other methods previously described. Moreover, if the camera is unable to collect certain parameters from captured image and/or the information/data collected from captured image is ambiguous, the carrier system 100 (and/or other appropriately configured computing entity/entities) may utilize the default configuration (which may be stored in the customer profile) in order to facilitate a shipment.

Referring to Block 405, some embodiments may configure the carrier system 100 (and/or other appropriately configured computing entity/entities) to determine related shipment data. For example, the carrier system 100 may determine contact information/data 800 from the task-management entry 600. In this scenario, the customer computing entity 110 initially determines the appropriate contact and sends the contact information/data 800 to the carrier system 100 (and/or other appropriately configured computing entity/entities) along with or as a part of the task-management information/data 605. This may advantageously provide the carrier system 100 (and/or other appropriately configured computing entity/entities) with all information/data necessary to process the entries with minimal latency due to travel times across the network 105. Moreover, in various embodiments, the customer computing entity 110 may identify relevant calendar information/data stored in the memory of the customer computing entity 110 that may be utilized to determine one or more dates to be associated with the task-management record. For example, the calendar information/data (e.g., received from a calendar software application) may identify a desired delivery date (e.g., a recipient's birthday date), a desired tender date, and/or the like.

Now turning to Block 410, once all relevant data/information has been determined and/or derived from the task-management information/data 605, the carrier system 100 may generate an electronic shipment record with the proposed tender dates. For example, the carrier system 100 may invoke an electronic component/module by initializing the electronic component/module (e.g. allocate the required memory resources) and then distribute all collected information data to the electronic component as input parameters. As will be recognized, this electronic component/module may be uniquely configured to assist in the completion of shipping related tasks and/or the like. Moreover, the electronic component may be operatively connected to the carrier system 100 or may be an internal component/module of the carrier system itself (and/or other appropriately configured computing entity/entities). In an embodiment, once the electronic component/module completes processing, the carrier system 100 may retrieve the output from the electronic component (e.g. a generated electronic shipping record) and proceed with further processing. For example, the carrier system 100 (and/or other appropriately configured computing entity/entities) may then transmit the electronic shipment record to the customer computing entity 110 for the customer/shipper 525 to review/confirm. For example, the generated electronic shipment record may be transmitted to the configuration management program as an automated prompt/alert 515 for the customer/shipper 525 to confirm the details and initialize the shipment. As will be recognized, the prompt/alert 515 may be transmitted (e.g., Block 415) to the bridging application (i.e., the configuration management program) for example by hyper-text transfer protocol (HTTP) packages across network 105.

In one embodiment, the carrier system 100 (and/or other appropriately configured computing entity/entities) may receive the confirmed electronic shipment record (e.g., Block 420) once it has been received/reviewed and confirmed by the customer/shipper 525 on the customer computing entity 110. The carrier system 100 may then generate an electronic package level detail (PLD) with the shipping information/data based at least in part on the electronic shipment record.

In one embodiment, the carrier system 100 (and/or other appropriately configured computing entity/entities) may facilitate a drop-off of the item/shipment 120. For example, the carrier system 100 (and/or other appropriately configured computing entity/entities) may transmit the generated PLD to the customer computing entity 110 to facilitate creation of the new task-management entries in the task-management program 610. In an embodiment, the carrier system 100 (and/or other appropriately configured computing entity/entities) may, by transmitting data through a bridging application or through an authorized connection to an appropriately configured API, invoke and/or automatically cause the task-management program 610 to activate/open and display the transmitted data to the customer/shipper 525 for review/confirmation/verification purposes. Once the new entries are generated, either in the background or as an active process/application to be viewed by the customer/shipper 525, such new task-management entries may proactively assist the customer/shipper 525 in timely dropping off item/shipment 120 525 for delivery and/or scheduling a pick-up for item/shipment 525.

Phase 1: Identify Prospective Shipment

Figure 5A:
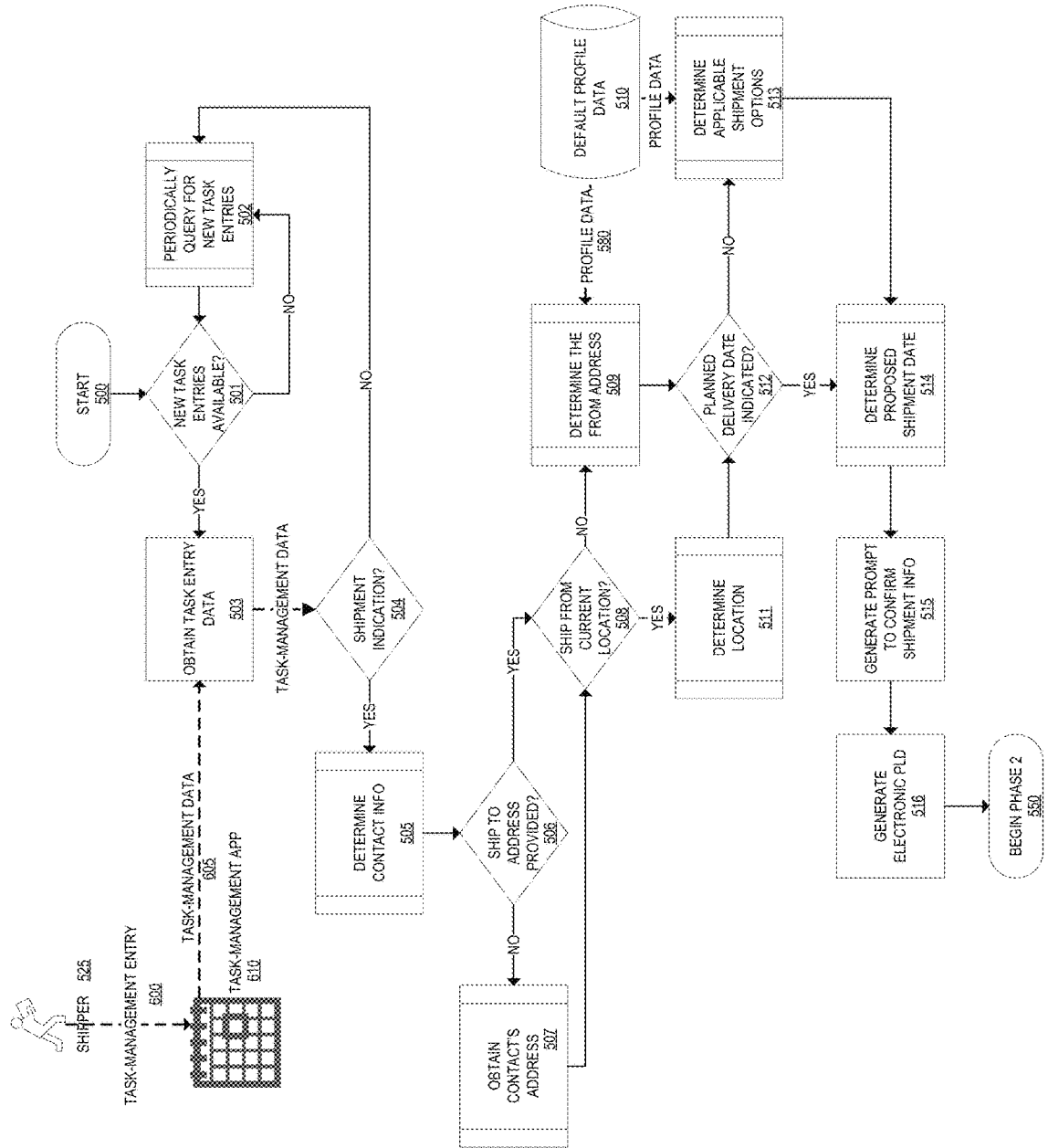
FIGS. 5A-5B are exemplary flow diagrams indicating various processes performed for generating task management items/shipments and shipment information/data as a part of an embodiment of the invention.

Reference will now be made to FIG. 5A, which is an exemplary flow diagram for identifying a prospective shipment based on user input information/data provided by the shipper 525 to a customer computing entity 110. As previously noted, various embodiments are configured for identifying prospective shipments/items as well as associated shipment data, based on user input to one or more task-management software applications. For example, upon receipt of user input identifying a shipping task of "Send package to Joe Smith by his birthday," various embodiments are configured to extract relevant package information/data from the provided user input to identify appropriate tender dates by which the shipper should tender the item/shipment 120 to a carrier in order to ensure that the item/shipment 120 is delivered by a desired delivery date.

As previously noted, the customer/shipper 525 may have to perform additional tasks to setup a default configuration in the event that certain parameters are missing and/or ambiguous in order to facilitate a shipment, As illustrated in FIG. 5A, the customer/shipper 525 initiates the process by creating a task management entry 600. For example, a customer/shipper 525 may provide user input regarding a particular shipping task that he or she would like to perform to a task-management software application executing on the customer computing entity 110. In various embodiments, the task-management software application may be configured to accept user input regarding a variety of shipment-related and/or non-shipment-related tasks. For example, the task management software application may be configured to accept tasks, such as general tasks such as "Pick-up cheese at store," "Take dog for walk," and/or shipping tasks such as "Send package to Joe," "Check tracking of shipped package," "Verify if tracking #1234567890 is included on next month's billing cycle." As will be recognized, the carrier system 100 may identify/characterize the tasks from the task management software application as general or shipping related tasks. For example, the carrier system 100 may identify/characterize the tasks as either a (a) shipment task, (b) return shipment task, (c) package visibility request, or (d) package payment request.

Figure 6B:
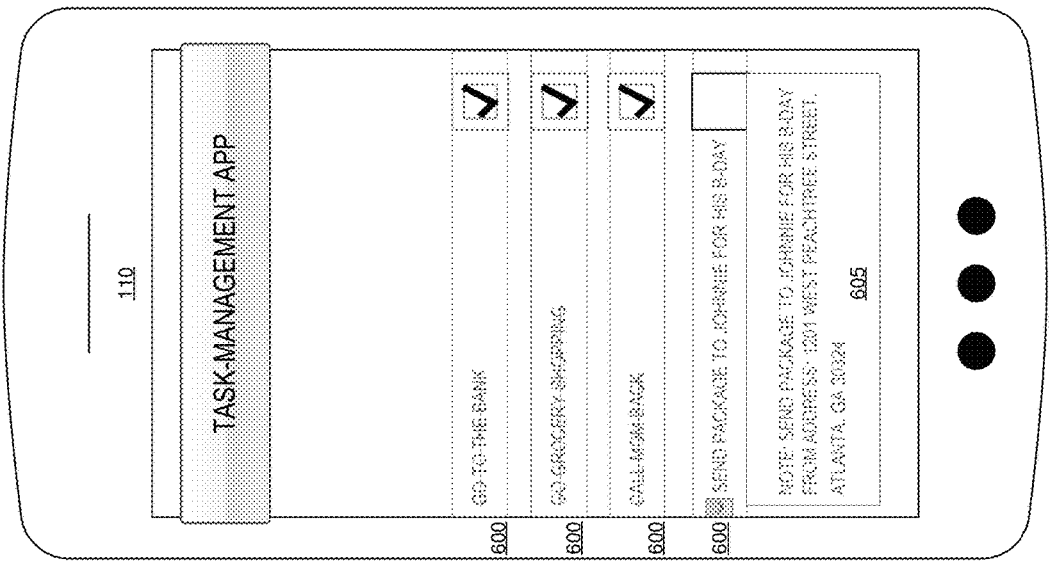
FIGS. 6A, 6B are example user interface screens of a task-management input source displaying task-management information/data in accordance with various embodiments of the present invention.

The carrier system 100 may detect/collect a task-management entry 600 by triggering a process 500 that periodically queries 502 the records associated with task-management program 610 to determine if there are new entries available 501. Upon determining that there is a new task management entry 600, the carrier system 100 (and/or other appropriately configured computing entity/entities) may receive the task entry information/data 503. For example, the carrier system 100 (and/or other appropriately configured computing entity/entities) may submit a pull request to the task-management program 610 of all relevant entries 600 that have been submitted since the last query 502 was made. Alternatively, the customer computing entities 110 may push the task entry information/data to the carrier system and/or other appropriately configured computing entities upon determining new entries are available. The process 503 of obtaining the information/data may result with the carrier system 100 collecting the task management entry 600 as well as any metadata (e.g., timestamps, URLs, user information, and/or the like). The combination of the content entered by the customer/shipper 525 and the metadata, which may be programmatically determined and/or stored by the task-management program 610 may result in the task-management information/data 605 that is received by the carrier system 100 (and/or other appropriately configured computing entity/entities). In addition, task-management information/data 605 may contain additional information/data stored in the task-management entry 600. Referring to FIG. 6B, which illustrates an example user interface illustrating a task management record, it can be seen that task-management information/data 605 may comprise additional content, such as user input notes, comments, and/or the like. In the illustrated embodiment of FIG. 6B, the additional user input notes may be shown in a selectable visible drop-down menu for each electronic task management record. In various embodiments, the task-management information/data 605 may also comprise additional "notes" such as the from-address for shipping the item/shipment 120.

Figure 6A:
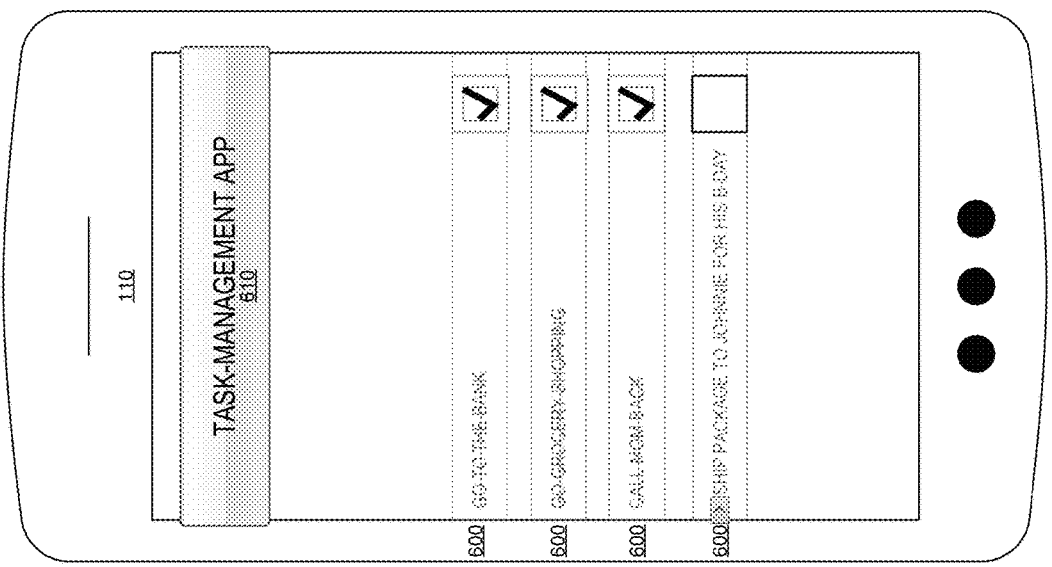
Figure 7B:
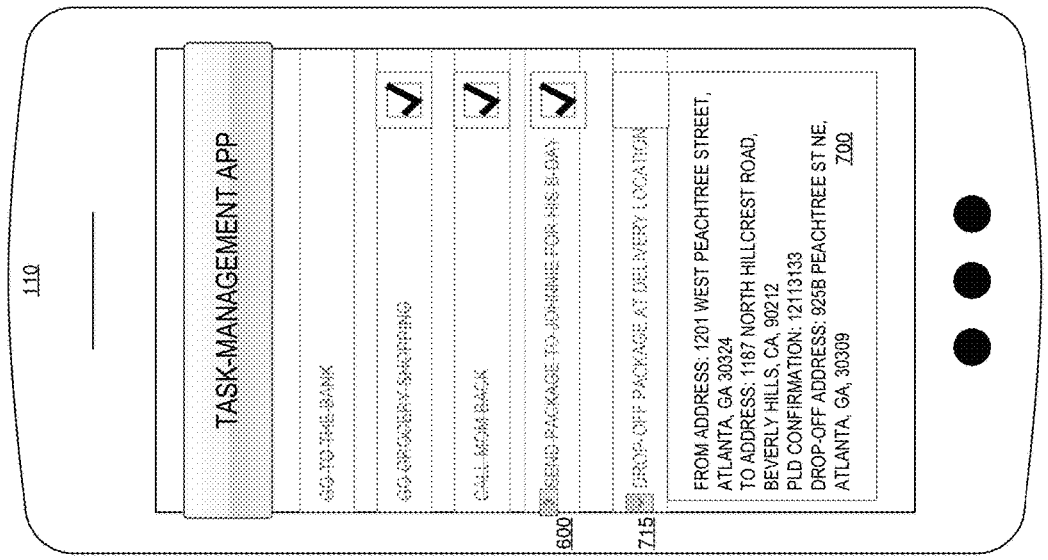
FIGS. 7A, 7B are example user interface screens of a task-management software application displaying advanced notifications in accordance with various embodiments of the present invention.
Figure 7A:
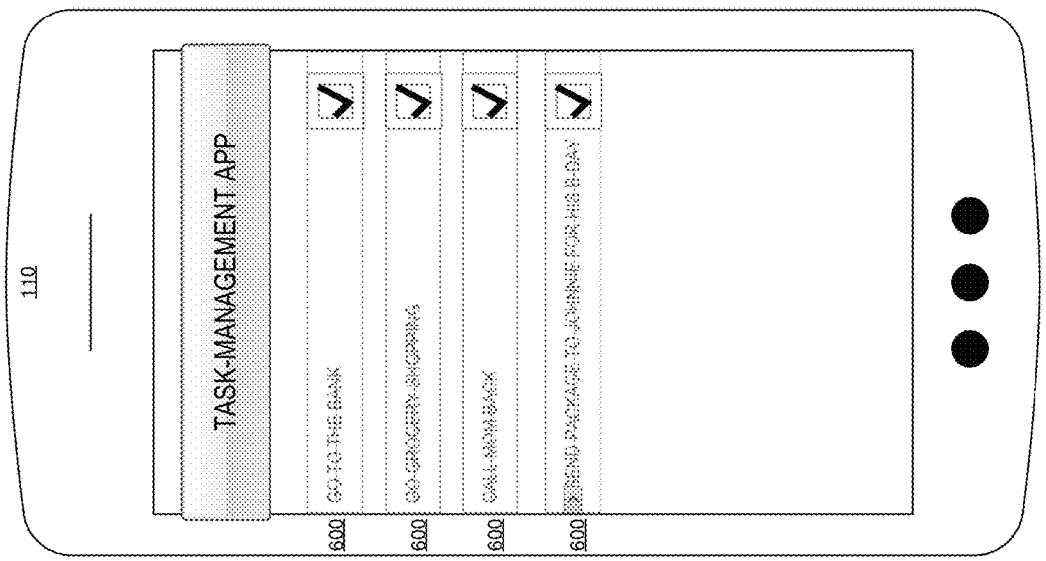

In an embodiment in which the carrier system 100 obtains the task-management information/data 605, it may programmatically loop through each entry to determine if the information/data 605 has a shipment indication 504. This shipment indication 504 may be in the form of keywords, phrases, codes, symbols, and/or the like present in a task-management record. As can be seen in FIG. 6A, an exemplary task-management program 610 contains a shipment indication for task-management entry 600, which states "Ship package to Johnnie for his b-day." In this scenario, the shipment indication may be the word "ship." Upon determining whether a shipment indication 504 exists, the carrier system 100 (and/or other appropriately configured computing entity/entities) may determine to either (a) ignore the entry, or (b) to continue processing and extract shipment data from the entry, as will be further explained below. In yet other embodiments, the customer computing entity 110 may be configured to identify those entries comprising shipment indications 504 before electrically transmitting task management information/data to the carrier system 100 (and/or other appropriately configured computing entity/entities). Accordingly, the customer computing entity 110 may be configured to transmit task management information/data regarding only those entries comprising shipment indications 504 to the carrier system 100.

In one embodiment, once the shipment indication 504 indicates to continue processing, the carrier system 100 (and/or other appropriately configured computing entity/entities) may be configured to characterize the shipping task indicated by the task-management record. For example, the carrier system 100 may be configured to determine whether the task-management record indicates that the task is to ship an item/shipment, track an existing item/shipment en route to a destination, and/or the like. In various embodiments, the carrier system 100 may be configured to characterize the task based on keywords within the task-management record. For example, "ship to" may be indicative of a task for initializing a new shipment, "track" may be indicative of tracking an existing item/shipment, and/or the like.

By characterizing the task identified by the task-management record, the carrier system 100 may be configured to determine whether the shipping task encompasses one or more electronic components, such as accessing tracking information for an existing shipment, generating PLD data for a new item/shipment, and/or the like. Thus, the carrier system 100 may be configured to initialize one or more of the electronic components of the shipping task automatically, without additional user input, thereby facilitating the identified shipment related task for the user.

Upon determining that a task-management record indicates that a new item/shipment is to be shipped, the carrier system 100 may initialize one or more electronic components of the shipping task for transporting the item/shipment 120 from an origin to a destination. The carrier system 100 may be configured to extract 505 the parameters necessary to initialize the shipment from the task-management record, such as the contact information/data for whom the customer/shipper 525 intends to send the item/shipment 120 in order to generate PLD data to be utilized by the carrier to direct the item/shipment to its respective destination and/or to permit users to electronically track the location of the item/shipment. For example, the carrier system 100 (and/or other appropriately configured computing entity/entities) may collect contact information/data records from the customer computing entity 110 via a bridging application that is installed and executed locally on the customer computing entity 110. In this example, bridging application (also referred to herein interchangeably as the configuration management program) may have the relevant permissions to view/retrieve contacts from the customer computing entity 110. The carrier system 100 may then systematically use each word and/or combinations of each word in the task-management information/data 605 and compare against a listing of all contacts retrieved. Referring to the above-mentioned example, the carrier system 100 (and/or other appropriately configured computing entity/entities) can analyze the "Ship package to Johnnie for his b-day" entry, extract data indicating that the shipment is destined for "Johnnie" (e.g., by parsing/extracting the entry to identify individual words and/or phrases that correspond to particular aspects of shipment data) and subsequently find a contact match for the word "Johnnie." For example, the carrier system 100 (and/or other appropriately configured computing entity/entities) may utilize a previously authorized protocol to connect to a database 575 stored on the customer computing entity 110. This database 575 may comprise all relevant contact information/data associated with customer/shipper 525 and/or all relevant calendar information/data associated with the customer/shipper 525. Once the carrier system 100 successfully connects to the database 575, it may programmatically cycle through each recognized and/or extracted word and/or character combination (e.g., "Ship," "package," "to," "Johnnie") from the task-management entry 600. On each iteration of the cycle, the carrier system 100 (and/or other appropriately configured computing entity/entities) may then query each word and/or character combination against the database 575 and store the query results in a contacts list. In this scenario, the carrier system 100 may successfully find an appropriate contact match when querying the database 575 against the word "Johnnie."

In one embodiment, if the system finds multiple possible matches to the word and/or character combination "Johnnie," the system may perform a "best guess," which can be reviewed by the customer/shipper 525 later in the process. The carrier system 100 (and/or other appropriately configured computing entity/entities) may then collect all information/data associated with the contact "Johnnie Doe." With reference to FIG. 9A, an exemplary depiction of contact information/data that may be utilized by the carrier system 100 (and/or other appropriately configured computing entity/entities) can be seen. In this example, the customer computing entity 110 has a contacts module that contains typical/data 800 available such as the name, e-mail, address, and date of birth. All such information/data 800 may be available to the carrier system 100 for further processing.

Referring back to FIG. 5A, the carrier system 100 (and/or other appropriately configured computing entity/entities) may determine 506 if a ship-to address is provided in the task-management information/data 605. In one embodiment, the carrier system 100 (and/or other appropriately configured computing entity/entities) may also derive/obtain 507 the ship-to address from the contact information/data 800 and/or the task-management information/data 605. As an example, with the carrier system 100 determining that "Johnnie Doe" is the appropriate contact, the carrier system 100 (and/or other appropriately configured computing entity/entities) may then analyze the information/data 800 and reference the corresponding date of birth (DOB) field to infer/suggest/determine that the ship-to address is "1201 West Peachtree Street, Atlanta, Ga., 30309."

Once the ship-to address has been obtained/inferred, the carrier system 100 (and/or other appropriately configured computing entity/entities) may programmatically determine 509 the ship-from/origin location. In one embodiment, the carrier system 100 may monitor and collect/determine 511 the location of the customer computing entity 110. For example, the carrier system 100 may periodically receive information/data from a location-determining device in association with the customer computing entity 110. This collected location information/data may then be used to identify the ship-from location.

For example, in general terms, the locations of various entities (carrier system 100, customer computing entities 110, and/or the like) can be monitored or determined/identified by any of a variety of computing entities including carrier system 100, customer computing entities 110, and/or the like. For example, the locations may be monitored or determined/identified with the aid of or in coordination with location-determining devices, location-determining aspects, location-determining features, location-determining functionality, location-determining sensors, and/or other location services. Such may include GPS; cellular assisted GPS; real time location systems or server technologies using received signal strength indicators from a Wi-Fi network); triangulating positions in connection with a variety of other systems, including cellular towers, Wi-Fi access points, and/or the like; and/or the like. Using these and other approaches and techniques, an appropriate computing entity (e.g., carrier system 100, customer computing entity 110, and/or the like) can determine, for example, whether and when entities are within a configurable/determinable distance/proximity from one another and/or a known location. That known location may have a corresponding physical address, which may be used as the ship-from/origin location. By way of example, assume John (carrying his customer computing entity 110) has the selected the configuration option to use his current location as the ship-from/origin location. An appropriate computing entity can make such a determination/identification based on the monitoring. In response, an appropriate computing entity (e.g., carrier system 100, user computing entity 110, and/or the like) can automatically provide appropriate location-based information/data (e.g., 40.7127837, −74.0059413) and transmit the appropriate location-based address (e.g., 1201 West Peachtree Street Northwest, Atlanta, Ga., United States) to the appropriate entity to assign "1201 West Peachtree Street Northwest, Atlanta, Ga., United States" to the ship-from/origin location.

In another embodiment, the carrier system 100 may have a default ship-from/origin location. For example, the carrier system 100 may be collected from the customer computing entity 110 in the form of profile information/data 580 that is stored in a database 510 associated with the configuration management program. The carrier system 100 (and/or other appropriately configured computing entity/entities) may also proactively offer each above-mentioned process as a user-selectable option 508 and store the selected option as the default process in the database 510 associated with the database 510 associated with the configuration management program. For example, the carrier system 100 may proactively request the appropriate information/data during the registration process of the customer profile in a manner as previously described herein. Alternatively, if the carrier system 100 (and/or other appropriately configured computing entity/entities) recognizes that the fields associated with the appropriate information/data are missing from the default configuration, the carrier system 100 may request the appropriate information/data during the initial processing of task-management entry 600 (e.g., as a pop-up prompt to fill in relevant data). Moreover, the carrier system 100 may prompt the customer/shipper 525 with the option to store the appropriate information/data in the customer profile for future use.

In certain embodiments, other information/data that may be derived and utilized to complete the shipment initialization process is the planned delivery date of the item/shipment 120. As will be recognized, the carrier system 100 (and/or other appropriately configured computing entity/entities) may analyze the task-management information/data 605 to determine if a shipment/tender date is indicated, as seen in process 512. Furthermore, the carrier system 100 (and/or other appropriately configured computing entity/entities) may infer the planned shipment date by utilizing contextual information/data in the task-management information/data 605. For example, the carrier system 100 may infer from the entry "Ship package to Johnnie for his b-day" that the "b-day" corresponds to the planned date of arrival. The carrier system 100 may then access the contact information/data 800 to pull the DOB information/data for "Johnnie Doe," which in this exemplary case is Nov. 15, 2000.

In some embodiments, the carrier system 100 may obtain/determine the planned arrival date from information/data comprising a delineated date. By way of example, the task-management information/data 605 may contain the entry "Ship package to Johnnie to receive by May 1, 2016." In this scenario, the carrier system 100 (and/or other appropriately configured computing entity/entities) may recognize "May" as a calendar month and subsequently collect the appropriate words and/or character combinations to determine the planned arrival date to be "May 1, 2016." For example, the carrier system 100 may programmatically cycle through each recognized word and/or character combination (e.g., "Ship," "package," "to," "Johnnie," "to," "receive," "by," "May," "1," "2016") from the task-management information/data 605. On each iteration of the cycle, the carrier system 100 (and/or other appropriately configured computing entity/entities) may attempt to instantiate each word and/or character combination as a "date" or "date-time" object to determine if the combination is an appropriate date. In another embodiment, the carrier system 100 may programmatically monitor the task-management information/data 605 for known calendar keywords (e.g., Jan, January, February, etc.) which may indicate to the carrier system 100 that the task-management information/data 605 contains a delineated date.

In this manner, the carrier system 100 (and/or other appropriately configured computing entity/entities) may be configured to determine 514 the date by which the user intends for an item/shipment 120 to arrive at a certain location. For example, if the user intends to deliver the item/shipment 120 on or before Christmas, 2016, the (e.g., item/shipment 120, carrier system 100, customer computing entities 110, and/or the like) would recognize that Christmas is a non-operational day for the carrier and appropriately assign planned arrival date as Saturday, Dec. 24, 2016.

For example, the carrier system 100 (and/or other appropriately configured computing entity/entities) may be configured to query an internal carrier database that stores package level detail information/data and shipment transit information/data about one or more items/shipments 120 including the destination location, the origin shipping information/data (e.g., origin location, origin time-zone, etc.), in-transit data, exception data, and/or delivery information/data (e.g., the planned arrival date). Based on the query results containing transmit information, the carrier system 100 may calculate the number of days before arrival the item/shipment 120 should be tendered and assign the tender date as the calculated/determined number of days before the planned arrival date. As will be recognized, this process may be repeated multiple times, depending on the number of applicable service levels that may be applied in between the initial processing date and the planned arrival date. In one embodiment, the carrier system 100 may also query the customer profile comprising the default configuration information/data to determine if a preferred service level has been selected. Moreover, the carrier system 100 (and/or other appropriately configured computing entity/entities) may exclude any non-operational days (e.g., Holidays) in its calculation of applicable shipment options 591.

In one embodiment, the carrier system 100 may propose multiple planned shipment dates. As an example, the latest planned tender date may correspond to the date obtained from task-management information/data 605. The carrier system 100 (and/or other appropriately configured computing entity/entities) may also determine the applicable shipment options 591 in between the current date and the planned arrival date. For example, each planned shipment date may be associated with a different carrier service level. Further, if the planned arrival date is Dec. 25, 2016 and the initial date of which the carrier system 100 has begun processing the task-management information/data 605 is Dec. 15, 2016, the carrier system 100 may determine the planned arrival date to be Dec. 25, 2016, the proposed alternative shipment dates may correspond to arrival by Dec. 16, 2016 (using Next-Day Air); arrival by Dec. 17, 2016 (using 2-Day Air); arrival by Dec. 25, 2016 (using Ground shipping); and/or the like. As will be appreciated, the planned arrival dates as well as the alternative proposed shipment dates may correspond to the ship-to location, the ship-from location, any default shipment options that are stored in the configuration management program, and/or the like.

In the scenario where the task-management information/data 605 does not contain any keywords or suggestions to derive the planned arrival date, the carrier system 100 (and/or other appropriately configured computing entity/entities) may provide the planned arrival date and the proposed alternative tender dates by utilizing the initial date of which the carrier system 100 (and/or other appropriately configured computing entity/entities) processed the task-management information/data 605. For example, if the initial processing date is Dec. 1, 2016, the carrier system 100 may determine the planned arrival date to be the initial date plus the estimated number of days for ground shipping to arrive at the desired location (e.g., Dec. 10, 2016). The alternative proposed shipment dates may correspond to arrival by Dec. 2, 2016 (using Next-Day Air); arrival by Dec. 3, 2016 (using 2-Day Air); and/or the like. As will be recognized, the carrier system 100 may automatically determine the multiple proposed tender dates in real-time. For example, the carrier system 100 (and/or other appropriately configured computing entity/entities) may continuously monitor the task-management program 610 and, immediately following a determination that a task-management entry 600 has been created, the system 100 can begin processing until the multiple proposed tender dates have been determined/calculated, based on the information/data contained in the task-management entry 600 and/or the task-management entry information/data 605.

As will be recognized, the carrier system 100 advantageously provides many capabilities to the customer/shipper 525 previously not possible. For example, the multiple tender dates calculated and generated in real-time provides a process for streamlining appropriate data/information in an efficient manner, thus removing often painstaking intermediary steps involving initial setup of shipping information/data for a time-sensitive shipping task (e.g. sending a package by a relative's birthday). For example, the customer/shipper 525 may simply provide contextual information/data in a task-management program 610 to trigger automated generation of an electronic shipping record, as later discussed in detailed.

In addition, the embodiments described herein are configured to utilize information/data in an optimal fashion. For example, the carrier system 100 (and/or other appropriately configured computing entity/entities) may utilize a customer profile comprising a default configuration to optimally provide information/data that the customer/shipper 525 historically would have to fill in. Moreover, the carrier system 100 may further optimize information/data sharing to the customer/shipper 525 by only providing shipping information/data that is relevant/needed by the customer/shipper 525, thus limiting vital computational calculations of the mobile device 110. Conveniently, by automatically generating proposed tender dates in real-time, this allows an improvement in the battery conservation of the appropriate entity (e.g., mobile device 110) by reducing the necessary time the customer/shipper 525 must interface with the di splay (i.e., reducing battery consumption) of the appropriate entity (e.g., mobile device 110).

As will be appreciated, the carrier system 100 as described herein has been advantageously configured to only provide information/data regarding shipment options 591 that ensure the package will arrive by the planned arrival date. For example, all shipment options 591 that do not allow the item/shipment 120 525 to arrive at the destination location by the planned arrival date will not be considered and thus not relayed to the customer/shipper 525.

In one embodiment, once all relevant data/information has been determined and/or derived from the task-management information/data 605, the carrier system 100 (and/or other appropriately configured computing entity/entities) may generate an electronic shipment record with the proposed tender dates and transmit the electronic shipment record to the customer computing entity 110 via the network 105. The generated electronic shipment record may be transmitted to the configuration management program as an automated prompt/alert 515 for the customer/shipper 525 to confirm the details and initialize the shipment. In some embodiments, the shipment information/data may be transmitted to the bridging application (i.e., the configuration management program, for example by utilizing hyper-text transfer protocol (HTTP) packets across network 105 and displayed via a prompt/alert 515.

In various embodiments, the carrier system 100 may be configured to generate the electronic shipping record for an anticipated shipment based at least in part on contextual information/data provided as a portion of the task-management record. In various embodiments, the carrier system 100 may be configured to identify and/or characterize contextual information/data based on keywords within the task-management record (e.g., generic keywords stored by the carrier system 100 and/or user-specific keywords identified based at least in part on other data stored within the mobile computing device. For example, user-specific keywords may be generated based at least in part on a contact list (e.g., names of individual contacts stored within the mobile computing device), a customer profiles storing data indicative of user-specific key words, and/or the like.

For example, the carrier system 100 may identify the accounts/profiles for one or more potential shipment/item recipients (e.g., "John" and "Joey") using unique identifiers corresponding to the potential shipment/item recipients (e.g., a phone number, an address, user name, a name, and/or other information/data) and automatically generate/create an electronic item/shipment 120 record for the same. In other examples, the accounts/profiles can be determined/identified from online handles, usernames, user IDs, screen names, emojis, characters, images, icons, text, colors, and/or the like. The electronic shipping record may include information/data about the sender/consignor, the consignee/intended recipient of the item, the item, the delivery service level for the item, payment information/data, and/or the like.

In one embodiment, in addition to generating/creating a shipping record, the carrier system 100 can automatically generate and/or provide an item/shipment 120 label (corresponding to the electronic item/shipment 120 record) to be printed and affixed to the item/shipment 120. The item/shipment 120 label may be configured to be affixed by the customer/shipper 525, and/or the sender/consignor, and/or the carrier/transporter. As just one example, an item/shipment consignor may tender the item/shipment 120 to a carrier/transporter (not pictured) with only a unique identifier corresponding to a package recipient (e.g., a phone number, online handle, username, user ID, screen name, and/or the like) on an exterior of a packaging of the item/shipment 120. In such embodiments, the carrier system 100 may be configured to identify the corresponding item/shipment 120 record based on the unique identifiers for the item/shipment recipient once the item/shipment 120 is received by the carrier/transporter. The carrier system 100 may verify the item/shipment 120 by determining/identifying the corresponding electronic shipping record, generate/ create a label to be applied to the exterior of the item/shipment 120 if not already affixed, update the corresponding item/shipment 120 record to indicate the relevant activity, determine/identify the weight and size of the item/shipment 120 (e.g., including determining/identifying the dim weight of the item/shipment 120), determine/identify the transportations costs to be charged for transporting the item/shipment 120, charge the transportation costs for transporting the item/shipment 120, and/or allow the item/shipment 120 to be transported through the carrier's transportation and logistics network. This may involve one or more carriers/transporters as described U.S. Pat. Nos. 8,712,923 and 8,712,922, which are hereby incorporated in their entireties by reference.

In one embodiment, each item/shipment may be associated with a unique identifier (e.g., ARG159E shown in FIG. 16B) to be applied to the exterior of the package to identify individual items/shipments 120 (e.g., if a consignor sends multiple shipments to a consignee). In one embodiment, such unique identifiers may be represented as text, barcodes, tags, character strings, Aztec Codes, MaxiCodes, Data Matrices, QR Codes, electronic representations, and/or the like. Such concepts are described in U.S. Pat. No. 8,010,463, which his hereby incorporated in its entirety by reference.

In one embodiment, the carrier system 100 (and/or other appropriately configured computing entity/entities) may receive the confirmed electronic shipment record once it has been received/reviewed and confirmed by the customer/shipper 525 on the customer computing entity 110. The carrier system 100 may then generate 516 an electronic package level detail (PLD) with the shipping information/data based at least in part on the electronic shipment record, thereby completing the initialize shipment phase and beginning 550 phase 2 of the integration process.

Phase 2: Facilitate Drop-Off/Pick-Up of an Item/Shipment 120

Figure 5B:
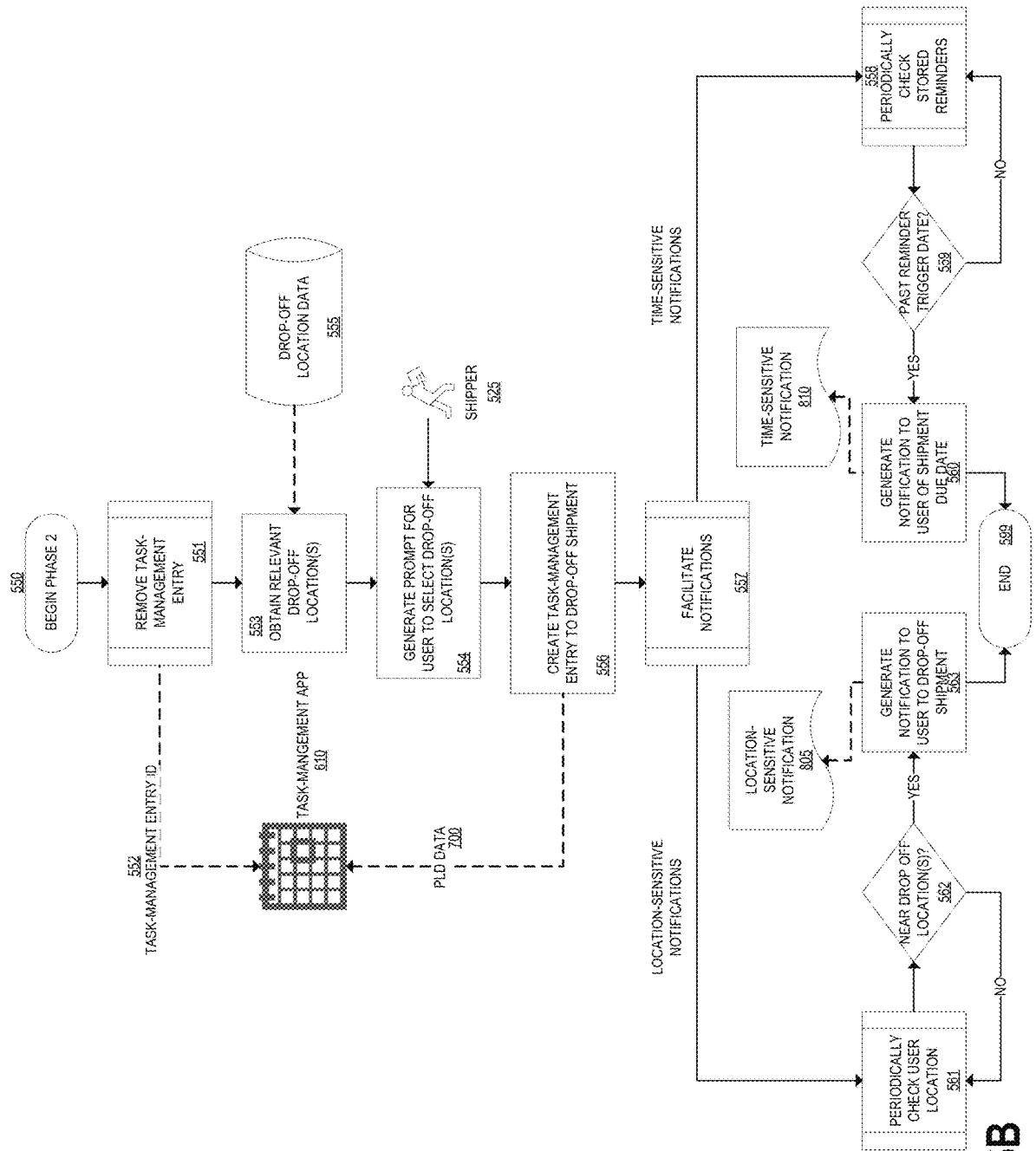

Reference will now be made to FIG. 5B, which describes an exemplary process for facilitating a drop-off or a pick-up of an item/shipment 120. In some embodiments, the carrier system 100 may be configured to automatically notify/alert the customer/shipper 525 via custom notifications, task-management items, calendar updates, and/or the like.

Figure 8B:
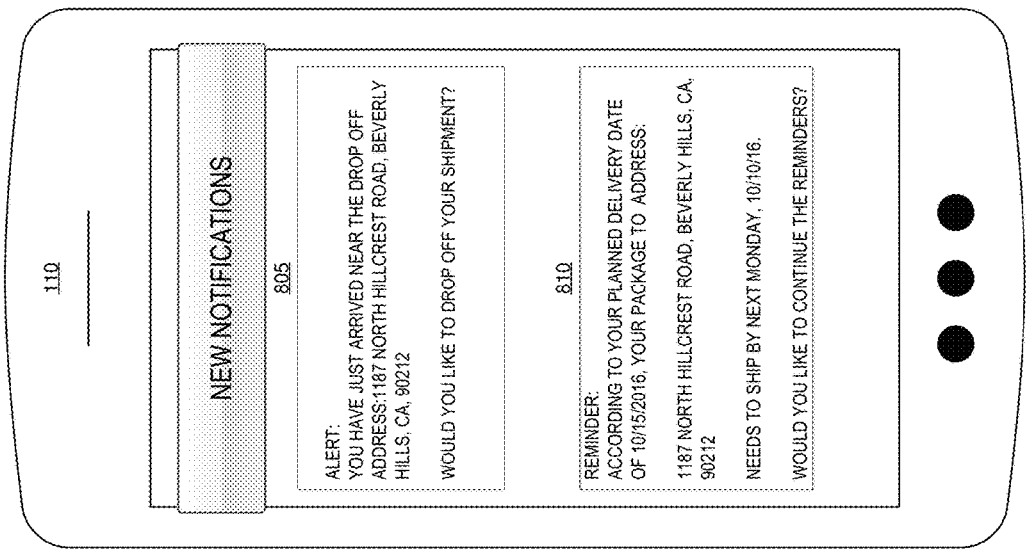
FIG. 8B is an example user interface screen incorporating advanced notifications in a task-management input source in accordance with various embodiments of the present invention.
Figure 8A:
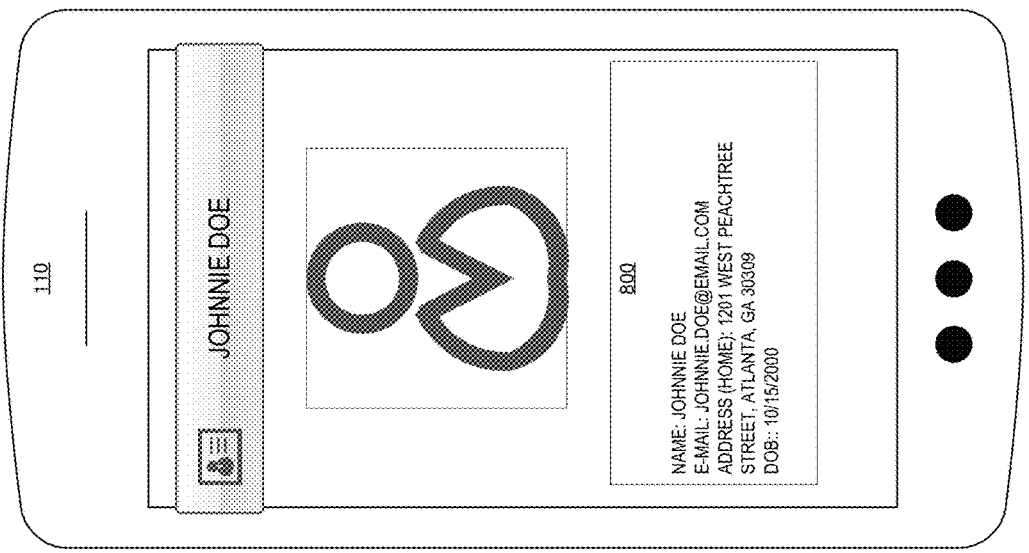
FIG. 8A is an example user interface screen of a contact management software application in accordance with various embodiments of the present invention.
Figure 9:
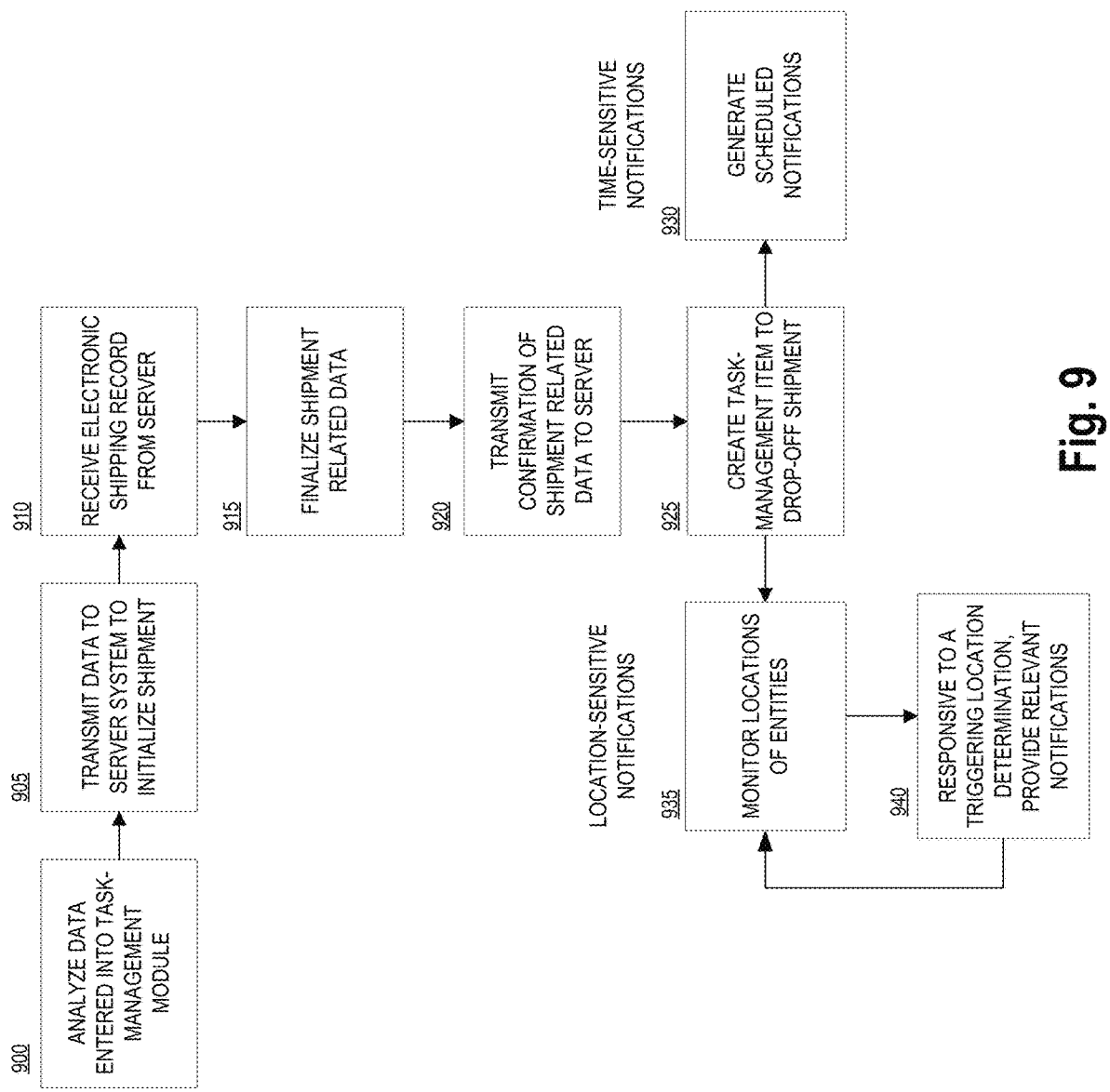
FIG. 9 is an exemplary flow diagram for integrating a server system with advanced notification and task-management software via a mobile device.

In one embodiment, the carrier system 100 (and/or other appropriately configured computing entity/entities) may remove 551 the processed task-management entry 600 of "Ship package to Johnnie for his b-day." An exemplary depiction of this process 551 can be seen in FIG. 8A. In this example, the carrier system 100 updates the task-management program 610 by using the initial task-management information/data 605, which may comprise the task-management entry id 552. Using the entry id 552, carrier system 100 may perform status updates and/or generate task-completion information/data corresponding to the respective task-management entry 600, so as to notify the customer/shipper 525 that this entry item/shipment 120 has been processed.

In one embodiment, the carrier system 100 may facilitate a drop-off of the item/shipment 120. For example, the carrier system 100 can obtain location information/data from the customer/shipper 525 and determine a customizable radius from that distance. In this manner, the carrier system 100 (and/or other appropriately configured computing entity/entities) may utilize other mapping systems and/or internal systems to determine locations to drop off the item/shipment 120. As can be seen in FIG. 7, the carrier system 100 may have access to an internal database 555 containing a plurality of drop-off locations (e.g., UPS Stores, UPS Drop Boxes, and/or the like). Once the locations are collected, the carrier system 100 may determine 553 if the drop-off location addresses are within the radius (e.g., as previously described herein) and generate a prompt 554 to the customer computing entity 110 for the customer/shipper 525 to review/select. For example, the carrier system 100 (and/or other appropriately configured computing entity/entities) may provide location-based notifications/messages in accordance with the corresponding notification/message preferences. In one embodiment, an appropriate computing entity can provide location-based notifications/messages when the configurable/determinable parameters are satisfied. For example, when an appropriate computing entity determines/identifies that the configurable/determinable parameters for the radius are satisfied, the appropriate computing entity can automatically provide appropriate location-based queued notifications/messages and/or automatically generate, queue, and transmit appropriate information/data comprising location-based notifications/messages (e.g., a pop-up, an application notification, etc.) in compliance with the corresponding notification/message preferences from the customer profile.

Upon selecting the relevant drop-off/origin locations, the carrier system 100 may receive the selection either by the task-management program 610, the configuration management program, or any other methods known in the art. Alternatively, the carrier system 100 may facilitate a pick-up of the item/shipment 120 from the from-address obtained from the previously-mentioned processing steps. For instance, the carrier system 100 (and/or other appropriately configured computing entity/entities) may prompt the user to select (e.g., from a list of available pick-up times displayed on a user interface) an appropriate time to schedule a pick up the item/shipment 120 from the from-address. By way of example, assume John (carrying his customer computing entity 110) has selected the configuration option to use his current location as the ship-from/origin location, the carrier system 100 (and/or other appropriately configured computing entity/entities) may prompt the user to select (e.g., from a list of available pick-up times displayed on a user interface) an appropriate time to schedule a pick-up of the item/shipment 120 from the from-address (e.g., the customer's/shipper's 525 current location).

In one embodiment, if the customer/shipper 525 elects to drop off the item/shipment 120 at one of the plurality of drop-off locations determined by the carrier system 100, the carrier system 100 may further facilitate the drop-off by interfacing with the task-management program 610 to create 556 a new entry item. For example, FIG. 8B shows a depiction of this process in which the carrier system 100 (and/or other appropriately configured computing entity/entities) generates a new task-management entry 715 for presentation in the task-management program 610. The new task-management entry 715 may have the updated PLD information/data 700 that was generated after the customer/shipper 525 confirmed the electronic shipment record. This PLD information/data 700 may comprise (a) the ship from-address, (b) the ship-to address, (c) PLD confirmation information, (d) the drop-off location address, (e) the planned arrival date, (f) the proposed shipment options, and/or other suitable information/data that may be utilized for the purposes of facilitating a drop-off and/or pick-up of an item/shipment 120. In the scenario in which the customer/shipper 525 elects to schedule a pick-up of an item/shipment 120, the PLD information/data 700 may also comprise the proposed date of which the package needs to be picked up in order to arrive by the planned arrival date.

In certain embodiments, the new task-management entry 715 may be generated prior to and/or without receiving the generated PLD information/data 700. In various embodiments, the carrier system 100 may generate multiple task-management entries 715, each corresponding to a particular service level (e.g., Next-Day Air, 2-Day Air, Ground, and/or the like) and/or tender date (e.g., Dec. 1, 2016, Dec. 2, 2016, etc.). Moreover, in various embodiments, the carrier system 100 (and/or other appropriately configured computing entity/entities) may be configured to automatically remove any past-due shipment-related tasks. For example, the carrier system 100 (and/or other appropriately configured computing entity/entities) may automatically monitor the generated task-management entries 715 and remove/delete the entry 715 corresponding to the ground service level once that service level is no longer able to successfully deliver the package to the destination by the planned arrival date. In one embodiment, the carrier system 100 programmatically continue this process of periodically monitoring all corresponding task-management entries 715 and may remove/delete all but the final remaining entry to drop-off (or pick-up) the package. This configuration enables the customer/shipper 525 multiple opportunities to be notified of the pending item/shipment 120 without allowing a situation in which all generated task-management entries are automatically deleted. In such embodiments, the carrier system 100 (and/or other appropriately configured computing entity/entities) may also delete all remaining new task-management entries 715 upon an indication that the package has been successfully dropped-off and/or picked up. For example, the carrier system 100 (and/or other appropriately configured computing entity/entities) may generate task-completion information/data upon receipt of an indication that one of the multiple new task-management entries 715 has been completed. Upon receiving this indication, the carrier system 100 may remove all of the remaining multiple new task-management entries 715 so as to avoid superfluous notifications.

In certain embodiments, the carrier system 100 (and/or other appropriately configured computing entity/entities) may generate 557 alerts/notifications alternative to or in addition to the new generated task-management entry 715. These alerts may comprise operating system level notifications, application specific notifications, reminders, timers, and/or the like. These alerts/notifications may be characterized as either time-sensitive alerts/notifications or location-sensitive alerts/notifications. Indeed, the carrier system 100 (and/or other appropriately configured computing entity/entities) may be configured to generate both type of alerts simultaneously. Further both categories of alerts may be controlled/selected in the configuration management program and transmitted to the carrier system 100 for storage in a configuration database, for example. Moreover, these location-sensitive alerts/notifications and time-sensitive alerts/notifications may be generated and presented in a user interface on the customer computing entity 110 as a direct result of the carrier system 100 (and/or other appropriately configured computing entity/entities) receiving confirmation of the electronic shipment record and/or selection of the drop-off locations previously presented. In one embodiment, the location-sensitive alerts/notifications and time-sensitive alerts/notifications may be generated (as depicted in step 559 and 560 of FIG. 7, respectively) without any additional interaction from the customer/shipper 525.

In an embodiment, the carrier system 100 may be configured to automatically complete and/or approve the previously generated new task-management entry 715 in the event that the item/shipment 120 is successfully dropped off at one of the plurality of drop-off locations. In this regard, the carrier system 100 may receive information/data indicating that the customer/shipper has completed the shipping task (e.g., physically dropped off and/or verified the item/shipment 120). For example, the customer computing entity 110 may be configured to generate data indicating the customer/shipper has entered a drop-off location. In various embodiments, the customer computing entity 110 may utilize data indicating the customer/shipper has been located within a drop-off location as a proxy for more specific data indicating the customer/shipper has actually dropped off the item. In certain embodiments, the carrier system 100 may be configured to receive data from one or more computing entities located at the drop-off location indicating that the customer has dropped off the item/shipment 120. For example, the drop-off location may be configured to update the electronic shipping record corresponding to the item/shipment 120 to indicate that the item/shipment 120 has been dropped off.

In such embodiments, the system may instruct a native reminder application/task-management application (e.g., to-do list)/calendar application and/or the like to generate and store reminders/task items/shipments to automatically complete the generated task-management entries as well as automatically notify the customer/shipper 5252 that the shipping task has been completed.

By way of example, FIG. 9B depicts an example of alerts that may be generated by the carrier system 100 (and/or other appropriately configured computing entity/entities). Referring to the above-mentioned example task-management entry 600, the location-sensitive alert/notification 805 is presented to the customer/shipper 525 on the customer computing entity 110. This location-sensitive alert/notification 805 may be triggered from the carrier system 100. For example, the carrier system 100 (and/or other appropriately configured computing entity/entities) may periodically receive location information/data from the customer computing entity 110. It should be recognized that the carrier system 100 (and/or other appropriately configured computing entity/entities) may also indeed query 765 the location information/data from the customer computing entity 110 in an effort to determine 770 if the customer computing entity 110 is near one or more of the proposed drop-off locations.

As can be seen in FIG. 9B, the time-sensitive alert/notification 810 may also be triggered from the carrier system 100. For example, the carrier system 100 (and/or other appropriately configured computing entity/entities) may store the time at which the notification/alert is scheduled to trigger and periodically check 558 the stored records to determine 559 if any alerts should be triggered to any devices. This step may be configured in a manner known in the art. Once appropriate, the carrier system 100 (and/or other appropriately configured computing entity/entities) may generate the notification and alert the customer computing entity 110 as previously described. Once all alerts and/or new task-management entry items/shipments 120 have been generated, the carrier system 100 may terminate with step 599.

FIG. 10 shows another high level exemplary flowchart of a process to integrate the carrier system 100 (and/or other appropriately configured computing entity/entities) with a task-management program 610. In this example, the process begins with a process on the customer computing entity 110 analyzing 900 new entries 600 into the task-management program 610. Once a new entry 600 has been found, the customer computing entity 110 may transmit 905 the entry information/data to a server system (e.g., the carrier system 100) to initialize a shipment. Next, the customer computing entity 110 may receive 910 an electronic shipment record from the server system with details that were derived from the entry information/data initially sent. In response to receiving the electronic shipment record from the server system, the customer computing entity 110 may finalize 915 the electronic shipment record. For example, the customer/shipper 525 may be presented (with or without any direct user interaction) the electronic shipment record with the intention of confirming the derived details. In the scenario where the customer/shipper 525 confirms the electronic shipment record (which may comprise reviewing and editing details of the electronic shipment record), the customer computing entity 110 may transmit 920 the confirmation shipment details back to the server system.

In one embodiment, the customer computing entity 110 may further create 925 a new task-management entry with the confirmed shipment details, for example with a third-party application or any mobile application affiliated with the server system.

In some embodiments, the customer computing entity 110 may also generate time-sensitive alerts/notifications 930 or location-sensitive alerts/notifications 935 in a manner previously described herein. As previously described, a variety of types of notifications/messages can be provided 940. With reference again to FIG. 9B, the depiction shows exemplary notifications/messages providing regarding a completed processing of a task-management entry item. For example, FIG. 9B shows a notification/message (e.g., a text message) that indicates where an item/shipment 120 may need to be dropped off and can be retrieved by the carrier. This location-based notification/message is provided to the customer in a time-appropriate manner (e.g., when he or she arrives at home or is in a physical location in which the drop-off location is close to the customer/shipper 525). As will be recognized, the notification/message may include images, links, advertisements, and/or the like. For example, the images and links may provide information/data about the location to drop off the item/shipment 120 (e.g., a picture of where the image is placed or open a map application that guides the customer to the item). As will be recognized, the notifications/messages can be provided in accordance with user notification/message preferences. For instance, the carrier system 100 (and/or other appropriately configured computing entity/entities) can automatically generate, queue, and/or transmit (e.g., provide) email notifications/messages to email addresses, text notifications/messages to cellular phones or applications, notifications/messages to designated applications, and/or the like.

In another example, assume John drives his vehicle 100 home and has his customer computing entity 110 on his person when arrives at his residence (34.3218697, −83.1239871). Upon doing so, John (e.g., the vehicle 100 and mobile phone 110) enters a geofence or is within a configurable/determinable distance/proximity of his residence. An appropriate computing entity can make such a determination/identification based on the monitoring (see FIG. 10). In response, an appropriate computing entity (e.g., carrier system 100, user computing entity 110, and/or the like) can automatically provide appropriate location-based queued notifications/messages and/or automatically generate, queue, and transmit appropriate location-based notifications/messages.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for generating updated electronic task management records accessible via a computing device to reflect shipment reminders for proposed shipments, wherein the method comprises:
   detecting creation of an electronic task-management record associated with a package comprising a first image of the package captured by a remote customer computing device, wherein the electronic task-management record is created via a communication interface, in an application executed by the remote customer computing device;
   extracting shipment data comprising a customer, a destination location, a desired delivery data, and a current location of the remote customer computing device at least in part from the detected electronic task-management record;
   in response to extracting the shipment data, generating a set of task-management entries and an electronic shipment record, the set of task-management entries comprising at least one tender date and an origin location, the electronic shipment record comprising a set of logistic instructions for routing the package from the origin location to the destination location;
   communicating the generated set of task-management entries to the remote customer device using the communication interface, wherein the communication causes the population of the electronic task-management record with the generated set of task-management entries;
   receiving a second image of the package from a location-monitoring networked device that captured the second image;
   extracting from the second image of the package a tendered location of the package;
   comparing the origin location from the set of task-management entries to the tendered location from the second image, wherein in response to a match between the origin location and the tendered location a shipment confirmation is communicated to the remote customer computing device via the communication interface, wherein in response to receipt of the shipment confirmation, the shipment confirmation updates the electronic task-management record by deleting the set of task-management entries from memory of the remote customer computing device by the application; and
   facilitating delivery of the package via the set of logistics instructions.

2. The method of claim 1, wherein updating the electronic task-management records generates one or more alerts using the remote customer device.

3. The method of claim 2, wherein at least one of the one or more alerts is based at least in part on the location of the remote customer computing device.

4. The method of claim 2, wherein at least one of the one or more alerts is based at least in part on a predetermined time corresponding to the at least one tender date.

5. The method of claim 1, wherein the extraction of shipping data automatically causes the remote customer computing device to activate a second software application installed on the customer computing device, wherein the second software application is configured to generate a user interface comprising a prompt for the customer to confirm the electronic shipment record.

6. The method of claim 1, wherein the electronic task-management record is selected from a group consisting of:
   i. a to-do list item,
   ii. an electronic reminder entry,
   iii. a calendar entry,
   iv. a voice-assisted command, and
   v. a captured image of the proposed shipment.

7. The method of claim 1, wherein extracting the shipment data further comprises:
   parsing the electronic task-management record to identify data indicative of an intended recipient;
   determining a destination location for the proposed shipment based at least in part on contact data corresponding to the intended recipient; and
   determining a desired delivery date based at least in part on the contact data corresponding to the intended recipient, wherein the contact data is maintained by the remote customer computing device.

8. The method of claim 1, further comprising:
   modifying the task management record upon receipt of the shipment confirmation to indicate that at least one of the one or more updated electronic task-management entries of the task management record is complete, wherein the shipment confirmation comprises a service level and an actual tender date corresponding to the updated electronic task-management record.

9. The method of claim 1, further comprising:
   modifying, via the one or more processors, at least one of the one or more updated electronic task-management records upon receipt of data indicating that the proposed shipment has been received by a drop-off location for delivery to the destination location.

10. The method of claim 1, wherein the task management record is selected from a group consisting of:
    i. a shipment task,
    ii. a return shipment task,
    iii. a package visibility request, and
    iv. a package payment request.

11. An apparatus for initializing and facilitating electronic task management records accessible via a computing device to reflect shipment reminders for proposed shipments, the apparatus comprising at least one processor and at least one memory including program code, the at least one memory and the program code configured to, with the at least one processor, cause the apparatus to at least:
    detecting creation of an electronic task-management record associated with a package comprising a first image of the package captured by a remote customer computing device, wherein the electronic task-management record is created via a communication interface, maintained by an application executed by the remote customer computing device;
    extracting shipment data comprising a customer, a destination location, a desired delivery data, and a current location of the remote customer computing device at least in part from the detected electronic task-management record;
    in response to extracting the shipment data, generating a set of task-management entries and an electronic shipment record, the set of task-management entries comprising at least one tender date and an origin location, the electronic shipment record comprising a set of logistic instructions for routing the package from the origin location to the destination location;
    communicating the generated set of task-management entries to the remote customer device using the communication interface, wherein the communication causes the population of the electronic task-management record with the generated set of task-management entries;
    receiving a second image of the package from a location-monitoring networked device that captured the second image;
    extracting from the second image of the package a tendered location of the package;
    comparing the origin location from the set of task-management entries to the tendered location from the second image, wherein in response to a match between the origin location and the tendered location a shipment confirmation is communicated to the remote customer computing device via the communication interface, wherein in response to receipt of the shipment confirmation, the shipment confirmation updates the electronic task-management record by deleting the set of task-management entries from a memory of the remote customer computing device by the application; and
    facilitating delivery of the package via the set of logistics instructions.

12. The apparatus of claim 11, wherein updating the electronic task-management records generates one or more alerts using the remote customer device.

13. The apparatus of claim 12, wherein at least one of the one or more alerts is based at least in part on the location of the remote customer computing device.

14. The apparatus of claim 12, wherein at least one of the one or more alerts is based at least in part on a predetermined time corresponding to the at least one tender date.

15. The apparatus of claim 11, wherein the extraction of shipping data automatically causes the remote customer computing device to activate a second software application installed on the customer computing device, wherein the second software application is configured to generate a user interface comprising a prompt for the customer to confirm the electronic shipment record.

16. The apparatus of claim 11, wherein the task-management record is selected from a group consisting of:
    i. a to-do list item,
    ii. an electronic reminder entry,
    iii. a calendar entry,
    iv. a voice-assisted command, and
    v. a captured image of the proposed shipment.

17. The apparatus of claim 11, wherein extracting the shipment data further comprises:
    parsing the electronic task-management record to identify data indicative of an intended recipient;
    determining a destination location for the proposed shipment based at least in part on contact data corresponding to the intended recipient; and
    determining a desired delivery date based at least in part on the contact data corresponding to the intended recipient, wherein the contact data is maintained by the remote customer computing device.

18. The apparatus of claim 11, wherein the at least one memory and the program code are additionally configured to, with the at least one processor, cause the apparatus to at least: modify the electronic shipment record for the proposed shipment upon receipt of data indicating that one of the one or more updated electronic task-management records is marked as complete, wherein the electronic shipment record is updated to reflect a service level and a tender date corresponding to the completed updated electronic task-management record.

19. The apparatus of claim 11, wherein the at least one memory and the program code are additionally configured to, with the at least one processor, cause the apparatus to at least:
modify the task management record upon receipt of the shipment confirmation to indicate that at least one of the one or more updated electronic task-management entries of the task management record is complete, wherein the confirmation comprises a service level and an actual tender date corresponding to the updated electronic task-management record.

20. The method of claim 1, wherein the shipping task is selected from a group consisting of:
i. a shipment task,
ii. a return shipment task,
iii. a package visibility request, and
iv. a package payment request.

21. A computer program product comprising at least one non-transitory computer-readable storage medium having computer-readable program code portions stored therein, the computer-readable program code portions comprising:
an executable portion configured to detect creation of an electronic task-management record including a first image of a package, the electronic task-management record maintained by an application executed by a remote customer computing device via a communication interface, wherein the first image is captured by the remote customer computing device;
an executable portion configured to extract shipment data comprising a customer, a destination location, a desired delivery data, and a current location of the remote customer computing device, at least in part, from the detected electronic task-management record;
an executable portion configured to generate a set of task-management entries and an electronic shipment record, the set of task-management entries comprising at least one tender date and an origin location, the electronic shipment record comprising a set of logistic instructions for routing the package from the origin location to the destination location in response to extracting the shipment data;
an executable portion configured to communicate the generated set of task-management entries to the remote customer device using the communication interface, wherein the communication causes the population of the electronic task-management record with the generated set of task-management entries;
an executable portion configured to receive a second image of the package from a location-monitoring networked device that captured the second image;
an executable portion configured to extract from the second image of the package a tendered location of the package;
an executable portion configured to compare the origin location from the set of task-management entries to the tendered location from the second image, wherein in response to a match between the origin location and the tendered location a shipment confirmation is communicated to the remote customer computing device via the communication interface, wherein in response to receipt of the shipment confirmation, the shipment confirmation updates the electronic task-management by deleting the set of task-management entries from a memory of the remote customer computing device by the application; and
an executable portion configured to facilitate delivery of the package via the set of logistics instructions.

22. The computer program product of claim 21, wherein updating the electronic task-management records comprise generation of one or more alerts in the application of the remote customer device.

23. The computer program product of claim 22, wherein at least one of the one or more alerts is based at least in part on the location of the remote customer computing device.

24. The computer program product of claim 22, wherein at least one of the one or more alerts is based at least in part on a predetermined time corresponding to the at least one tender date.

25. The computer program product of claim 21, wherein the extraction of shipping data automatically causes the remote customer computing device to activate a second software application installed on the customer computing device, wherein the second software application is configured to generate a user interface comprising a prompt for the customer to confirm the electronic shipment record.

26. The computer program product of claim 21, wherein the task-management record is selected from a group consisting of:
i. a to-do list item,
ii. an electronic reminder entry,
iii. a calendar entry,
iv. a voice-assisted command, and
v. a captured image of the proposed shipment.

27. The computer program product of claim 21, wherein the executable portion configured to receive extracted shipment data further comprises:
parsing the electronic task-management record to identify data indicative of an intended recipient;
determining a destination location for the proposed shipment based at least in part on contact data corresponding to the intended recipient; and
determining a desired delivery date based at least in part on the contact data corresponding to the intended recipient, wherein the contact data is maintained by the remote customer computing device.

28. The computer program product of claim 21, further comprising: an executable portion configured to modify the task management record upon receipt of the shipment confirmation to indicate that at least one of the one or more updated electronic task-management entries of the task management record is complete, wherein the shipment confirmation comprises a service level and an actual tender date corresponding to the updated electronic task-management record.

29. The computer program product of claim 21, further comprising: an executable portion configured to modify the electronic shipment record for the proposed shipment upon receipt of data indicating that one of the one or more updated electronic task-management records is marked as complete, wherein the electronic shipment record is updated to reflect a service level and a tender date corresponding to the completed updated electronic task-management record.

30. The method of claim 21, wherein the task management record is selected from a group consisting of:
v. a shipment task,
vi. a return shipment task,
vii. a package visibility request, and
viii. a package payment request.

* * * * *